(12) United States Patent
Yamada

(10) Patent No.: US 8,147,304 B2
(45) Date of Patent: Apr. 3, 2012

(54) STORAGE MEDIUM HAVING GAME PROGRAM STORED THEREON AND GAME APPARATUS

(75) Inventor: Yoichi Yamada, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1223 days.

(21) Appl. No.: 11/896,021

(22) Filed: Aug. 29, 2007

(65) Prior Publication Data

US 2009/0017909 A1    Jan. 15, 2009

(30) Foreign Application Priority Data

Jul. 9, 2007 (JP) ................. 2007-180292

(51) Int. Cl.
*A63F 9/24* (2006.01)
*A63F 13/00* (2006.01)

(52) U.S. Cl. ............. 463/2; 463/5; 463/8; 463/36
(58) Field of Classification Search ............ 463/2, 5, 463/8, 36
See application file for complete search history.

(56) References Cited

U.S. PATENT DOCUMENTS

| 4,522,409 | A | * | 6/1985 | Kobayashi ............ 463/53 |
| 5,310,192 | A | * | 5/1994 | Miyake ............... 463/5 |
| 5,370,399 | A | * | 12/1994 | Liverance ............ 463/23 |
| 7,771,279 | B2 | * | 8/2010 | Miyamoto et al. ..... 463/31 |
| 2005/0187023 | A1 | * | 8/2005 | Miyamoto et al. ..... 463/43 |

FOREIGN PATENT DOCUMENTS

JP    2005-246071    9/2005

OTHER PUBLICATIONS

Machine translation of JP 2005-246071 (Takashi et al.).*

* cited by examiner

*Primary Examiner* — Steven J Hylinski
(74) *Attorney, Agent, or Firm* — Nixon & Vanderhye P.C.

(57) ABSTRACT

The game apparatus shoots a moving object from a predetermined weapon object and moves the moving object in a three-dimensional space in a case where an input from an input device is received. At least one of the size, the shape, and the number of a contact determination area defined for the moving object is changed in accordance with a distance over which the moving object moves in the three-dimensional space. The game apparatus determines whether or not the contact determination area defined for the moving object contacts a contact determination area defined for a target object. A predetermined game process is performed when the determination result of a contact determination step is positive.

29 Claims, 10 Drawing Sheets

Fig. 12

| WEAPON ID | MAXIMUM FLYING DISTANCE | SPEED | REFERENCE RADIUS |
|---|---|---|---|
| 001 | 2000 | 10 | 2 |
| 002 | 3000 | 20 | 3 |
| 003 | 1000 | 50 | 1 |
| 004 | 2500 | 10 | 5 |
| ⋮ | ⋮ | ⋮ | ⋮ |

Fig. 13

| OBJECT ID | WEAPON ID | POSITION | ELAPSED TIME | MOVING DISTANCE | DETERMINATION AREA RADIUS | SHOOTING DIRECTION |
|---|---|---|---|---|---|---|
| 001 | 001 | (50,100,20) | 1 | 15 | 2 | (0,0,1) |
| 002 | 001 | (60,50,100) | 2 | 80 | 2.1 | (0,0,1) |
| 003 | 002 | (100,30,450) | 5 | 410 | 3.1 | (1,0,0) |
| ⋮ | ⋮ | ⋮ | ⋮ | ⋮ | ⋮ | ⋮ |

STORAGE MEDIUM HAVING GAME PROGRAM STORED THEREON AND GAME APPARATUS

CROSS REFERENCE TO RELATED APPLICATION

The disclosure of Japanese Patent Application No. 2007-180292, filed on Jul. 9, 2007, is incorporated herein by reference.

BACKGROUND OF THE INVENTION

1. Field of the Invention

The present invention relates to a storage medium having a game program stored thereon and a game apparatus, and more particularly to a storage medium having stored thereon a game program and a game apparatus which execute a game in which an object representing a target is shot in a virtual three-dimensional space.

2. Description of the Background Art

Conventionally, well-known is a game apparatus which executes a game in which a target object representing a target is shot in a virtual three-dimensional space. The game apparatus has a contact determination area defined for each of the target object, and a bullet object shot from a gun and the like, so as to determine whether or not a bullet hits a target. Specifically, whether or not the bullet has hit the target is determined depending on whether or not the target object contacts the bullet object. In general, the size and the shape of the contact determination area of each of the target object and the bullet object do not change in accordance with a game state. Accordingly, while the target object is moved, the contact determination area of the target object is also moved in accordance with the target object, and therefore it is difficult that a bullet hits a moving target, and it is likely to be too difficult for a player to play the game.

Patent Document 1 (Japanese Laid-Open Patent Publication No. 2005-246071) discloses a method for reducing the difficulty with which a bullet hits a moving target. The image generation system disclosed in Patent Document 1 determines whether or not a target object is moving, and when the target object is determined to be moving, the contact determination area of the target object is increased. Thus, the contact determination area of the bullet object more readily contacts the contact determination area of the target object, and therefore the bullet can more easily hit the moving target, thereby reducing the difficulty.

However, the image generation system disclosed in Patent Document 1 needs to determine whether or not all the target objects appearing in the three-dimensional space is moving so as to define, based on the determination result, the contact determination area. Accordingly, the image generation system has a problem that a processing load of the system changes depending on the number of the target objects appearing in the three-dimensional space, and the increased number of the target objects leads to an increase in processing load of the system.

SUMMARY OF THE INVENTION

Therefore, an object of the present invention is to provide a game program and a game apparatus capable of preventing a processing load of a system from being changed depending on the number of target objects, and executing a game process with a constant load.

The present invention has the following features to attain the object mentioned above. The reference numerals, supplementary descriptions and the like in the parentheses in the following description indicate the correspondence with the embodiment described below in order to aid in understanding the present invention and are not intended to limit, in any way, the scope of the present invention.

A first aspect of the present invention is directed to a computer-readable storage medium (optical disc 4) having stored thereon a game program (60) executed by a computer (the CPU 10 or the like) of a game apparatus (3) for executing a game in which a target object (51, 52, 53, 54) is shot in a virtual three-dimensional space (game space) in accordance with an input from an input device (controller 5). The game program causes the computer to execute: an input reception step (S2); a shooting step (S12, S14); an area change step (S17, S18); an area determination step (S7); and a contact process step (S8). In the input reception step, the computer receives an input of an instruction for shooting. In the shooting step, the computer shoots a moving object (arrow object 55) and moves the moving object in the virtual three-dimensional space in a case where the input reception step receives the input. In the area change step, the computer changes at least one of a size, a shape, and a number of a contact determination area defined for the moving object, by using a variable changing in accordance with the moving object being moved. In the contact determination step, the computer determines whether or not the contact determination area defined for the moving object contacts a contact determination area defined for the target object. In the contact process step, the computer performs a predetermined game process (contact process) when the contact determination step determines that the contact determination area defined for the moving object contacts the contact determination area defined for the target object.

In a second aspect, the variable may represent an elapsed time after the moving object is shot.

In a third aspect, the computer may change the contact determination area defined for the moving object, in the area change step, such that the longer the elapsed time is, the larger the contact determination area defined for the moving object is.

In a fourth aspect, the variable may represent a moving distance over which the moving object moves in the virtual three-dimensional space.

In a fifth aspect, the computer may change, in the area change step, the contact determination area defined for the moving object such that the greater the moving distance over which the moving object moves, the larger the size of the contact determination area defined for the moving object.

In a sixth aspect, the computer may change, in the area change step, at least one of the size, the shape and the number of the contact determination area defined for the moving object such that an area size of the contact determination area of the moving object as viewed from a moving direction of the moving object is increased in accordance with the variable being increased.

In a seventh aspect, the game program may cause the computer to further execute a display control step of generating an image of the virtual three-dimensional space such that a direction in which the moving object is shot is a direction from a front side to a far side in the virtual three-dimensional space on a screen, and displaying the image by a display device.

In an eighth aspect, for the size and the shape of the contact determination area defined for the moving object, predetermined size and shape may be used at a time when the moving object is shot. In this case, the area change step includes a multiplying factor calculation step (S17) and a transformation step (S18). In the multiplying factor calculation step, the computer calculates a multiplying factor in accordance with the elapsed time after the moving object is shot. In the transformation step, the computer transforms the contact determination area defined for the moving object at the time when the moving object is shot so as to be enlarged or reduced by using the multiplying factor.

In a ninth aspect, as the size and the shape of the contact determination area defined for the moving object, predetermined size and shape may be used at a time when the moving object is shot. In this case, the area change step includes a multiplying factor calculation step (S17) and a transformation step (S18). In the multiplying factor calculation step, the computer calculates a multiplying factor in accordance with the moving distance over which the moving object moves. In the transformation step, the computer transforms the contact determination area defined for the moving object at the time when the moving object is shot so as to be enlarged or reduced by using the multiplying factor.

In a tenth aspect, the computer may determine, in the shooting step, a direction in which the moving object is shot, by using the input from the input device.

In an eleventh aspect, the moving object of a plurality of types may be shot in the virtual three-dimensional space. In this case, the computer determines, in the area change step, a degree of change to which the contact determination area defined for the moving object is changed, for each of the plurality of types of the moving object.

Further, the present invention may be provided as a game apparatus having functions equivalent to those of the game apparatus which executes the respective steps of the first to the eleventh aspects. The game apparatus may allow the CPU which executes the game program to execute the respective steps described above, or may allow a dedicated circuit of the game apparatus to execute a portion of or all of the steps described above.

According to the first aspect, at least one of the size of each contact determination area defined for the moving object, the shape of each contact determination area defined for the moving object, and the number of the contact determination areas defined for the moving object is changed in accordance with the moving distance over which the moving object moves. Thus, the difficulty level at which the moving object hits the target object is changed in accordance with the moving distance. For example, the greater the moving distance is, the larger the contact determination area defined for the moving object is. In this case, the moving object more easily hits the target object, thereby reducing the difficulty level of the game. On the other hand, the greater the moving distance is, the smaller the contact determination area defined for the moving object is. In this case, the moving object less easily hits the target object, thereby increasing the difficulty level of the game. In other words, at least one of the size of each contact determination area defined for the moving object, the shape of each contact determination area defined for the moving object, and the number of the contact determination areas defined for the moving object is changed in accordance with the moving distance, thereby readily adjusting the difficulty level of the game. Further, in the present embodiment, the size of the contact determination area defined for the moving object is changed, and therefore the processing load for changing the contact determination area does not depend on the number of the target objects. Accordingly, the processing load of the game apparatus does not greatly change depending on the number of the target objects, thereby stabilizing the processing load of the game apparatus.

According to the second aspect, the contact determination area is changed by using the elapsed time after the moving object is shot, and therefore the contact determination area can be more easily changed as compared to a case where an actual moving distance is calculated.

According to the third aspect, the longer the elapsed time after the moving object is shot is, the larger the size of the contact determination area is, and therefore the moving object is allowed to more easily hit the target object distanced from a position at which the moving object has been shot. Thus, the difficulty level of the shooting can be reduced, thereby allowing a beginner or a player poor at playing the game to enjoy the shooting.

According to the fourth aspect, by calculating an actual moving distance, the accurate moving distance is used so as to change the contact determination area.

According to the fifth aspect, the greater the moving distance over which the moving object moves is, the larger the size of the contact determination area is, and therefore the moving object is allowed to more easily hit the target object distanced from the position at which the moving object has been shot. Thus, the difficulty level of the shooting can be reduced, thereby allowing a beginner or a player poor at playing the game to enjoy the shooting.

According to the sixth aspect, the moving object can more easily hit the target object, and therefore the difficulty level of the shooting can be reduced, thereby allowing a beginner or a player poor at playing the game to enjoy the shooting.

According to the seventh aspect, the moving object is moved from the front side to the far side in the virtual three-dimensional space on the screen, and therefore the target object distanced from the shooting position at which the moving object has been shot is displayed smaller than the target object near the shooting position. In this case, the moving object hits, with enhanced difficulty, the target object distanced from the shooting position, and therefore it is substantially effective to change the contact determination area such that the moving object can more easily hit the target object as in the third, the fifth and the sixth aspects.

According to the eighth or the ninth aspect, the contact determination area is enlarged or reduced by using the multiplying factor determined in accordance with the elapsed time or the moving distance, thereby easily transforming the contact determination area in accordance with the elapsed time or the moving distance.

According to the tenth aspect, it is possible to shoot the moving object in the direction as intended by a player.

According to the eleventh aspect, the difficulty level at which the moving object hits the target object may be set for each weapon object.

These and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a diagram illustrating exemplary contents of weapon list data 65;

FIG. 13 is a diagram illustrating exemplary contents of moving object data 67;

DESCRIPTION OF THE PREFERRED EMBODIMENTS (Entire Structure of Game System)

Figure 1:
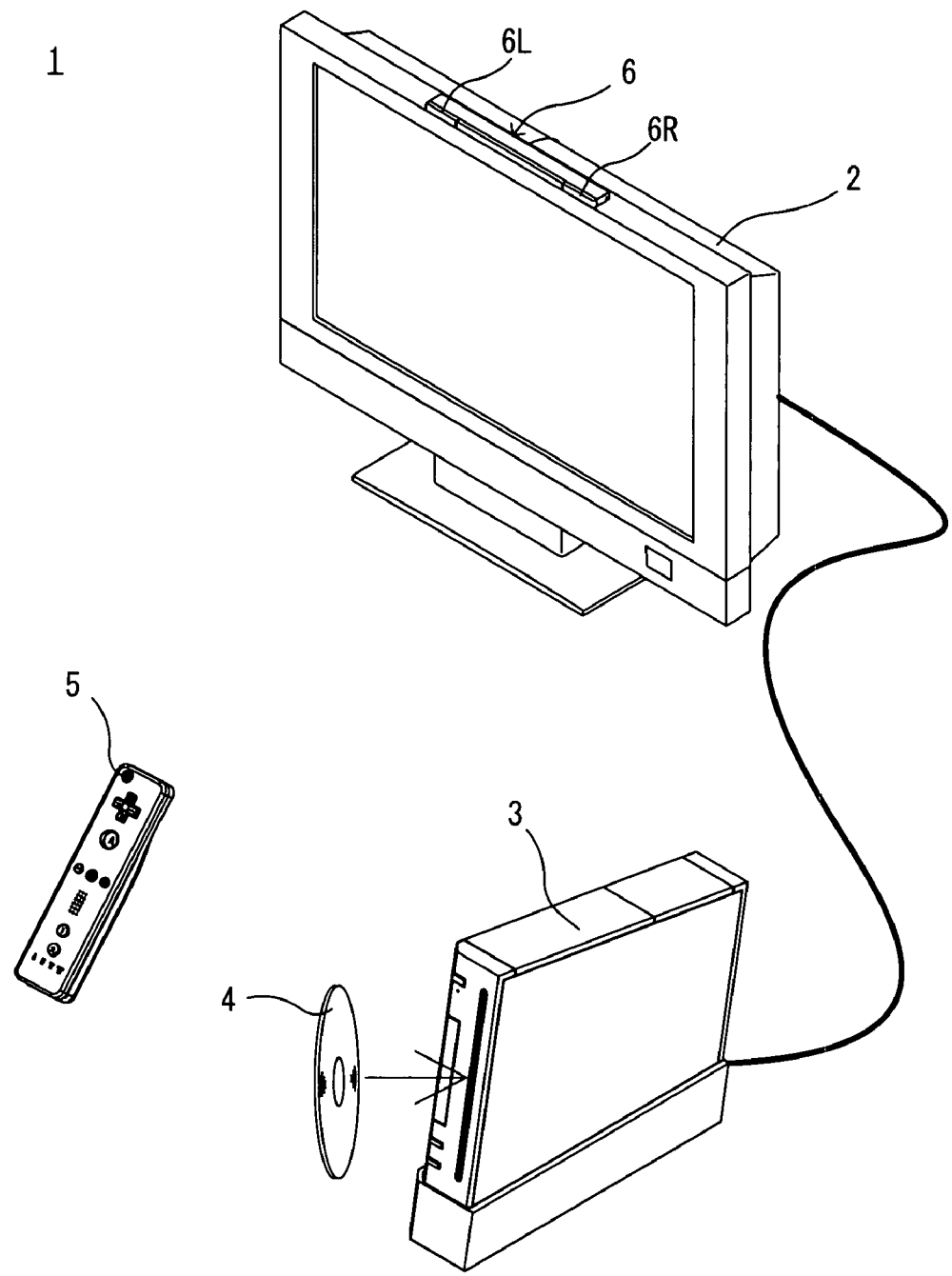
FIG. 1 is an external view illustrating a game system 1.

With reference to FIG. 1, a game system 1 including a game apparatus according to an embodiment of the present invention will be described. FIG. 1 is an external view illustrating the game system 1. Hereinafter, a game apparatus and a game program according to the present embodiment will be described by using a stationary game apparatus as an example. As shown in FIG. 1, the game system 1 includes a television receiver (herein after, referred to simply as a television set) 2, a game apparatus 3, an optical disc 4, a controller 5, and a marker section 6. The system according to the present embodiment allows the game apparatus 3 to execute, based on a game operation through the controller 5, a game process for a game in which a target object is shot in a virtual three-dimensional space.

In the game apparatus 3, the exchangeable optical disc 4 typifying an information storage medium capable of reading data is detachable inserted. In the optical disc 4, the game program executed by the game apparatus 3 is stored. The game apparatus 3 has, on the front surface thereof, an opening through which the optical disc 4 is inserted. The game apparatus 3 executes the game process by reading and executing the game program stored in the optical disc 4 which is inserted in the game apparatus 3 through the opening. The game program may be previously stored in an internal memory (which is preferably of a non-volatile type, but which may be of a volatile type). Alternatively, the game apparatus 3 may download the game program from a predetermined server (or another game apparatus) connected to the game apparatus 3 through a network, and stores the downloaded game program in the internal memory.

The game apparatus 3 is connected through a connection cord to the television set 2 typifying a display device. The television set 2 displays a game image generated through the game process executed by the game apparatus 3. Further, the marker section 6 is provided in the vicinity of the screen of the television set 2 (on the top surface of a screen of the television set 2 in FIG. 1). The marker section 6 includes two markers, a marker 6R and a marker 6L, at both ends thereof. Specifically, each of the markers 6R and 6L includes at least one infrared LED, and emits an infrared light forward from the television set 2. The marker section 6 is connected to the game apparatus 3, and the game apparatus 3 is capable of controlling each infrared LED included in the marker section 6 so as to be lit up.

The controller 5 is an input device for supplying, to the game apparatus 3, operation data representing a content of an action performed on the controller 5. The controller 5 is connected to the game apparatus 3 by wireless communication. In the present embodiment, for example, the Bluetooth (registered trademark) technology is used for the wireless communication between the controller 5 and the game apparatus 3. The controller 5 and the game apparatus 3 need to communicate with each other. Therefore, in another embodiment, the controller 5 and the game apparatus 3 may communicate with each other by, for example, a wired connection.

(Internal Structure of Game Apparatus 3)

Figure 2:
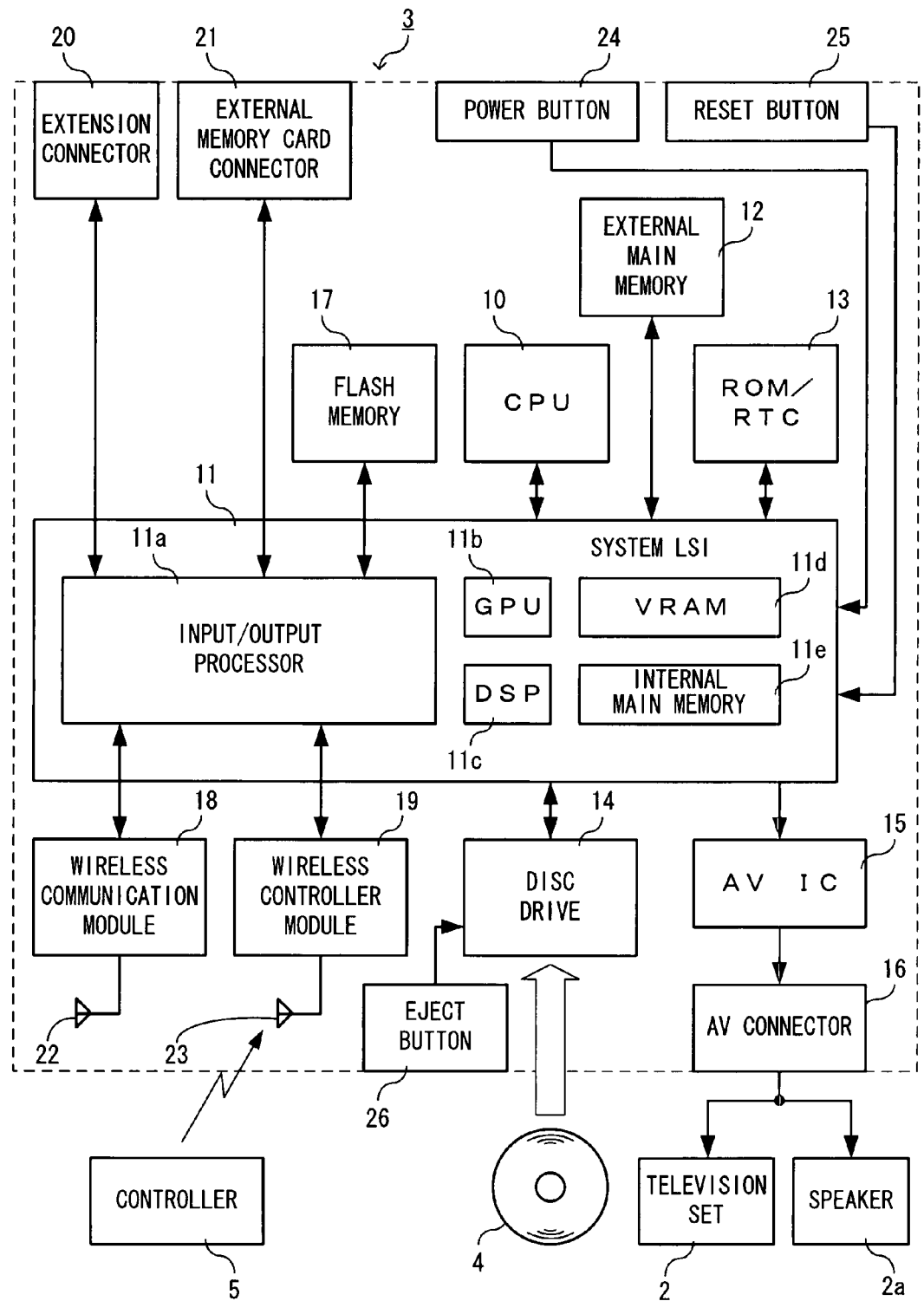
FIG. 2 is a functional block diagram of a game apparatus 3.

Next, with reference to FIG. 2, an internal structure of the game apparatus 3 will be described. FIG. 2 is a block diagram illustrating a structure of the game apparatus 3. The game apparatus 3 includes: the CPU 10; a system LSI 11; an external main memory 12; a ROM/RTC 13; a disc drive 14; an AV-IC 15, and the like.

The CPU 10, serving as a game processor, executes the game program stored in the optical disc 4 so as to perform a game process. The CPU 10 is connected to the system LSI 11. In addition to the CPU 10, the external main memory 12, the ROM/RTC 13, the disc drive 14, and the AV-IC 15 are also connected to the system LSI 11. The system LSI 11 performs processing such as control of data transmission between respective components connected thereto, generation of an image to be displayed, and acquisition of data from an external apparatus. An internal structure of the system LSI 11 will be described below. The external main memory 12, which is of a volatile type, stores programs, such as a game program loaded from the optical disc 4 or the flash memory 17, and various data, and is used as a work area and a buffer area for the CPU 10. The ROM/RTC 13 includes a ROM (so-called a boot ROM) incorporating a program for booting the game apparatus 3, and a clock circuit (RTC: real time clock) for counting time. The disc drive 14 reads, from the optical disc 4, program data, texture data and the like, and writes the read data into an internal main memory 11e described below or the external main memory 12.

Provided in the system LSI 11 are an input/output process or 11a, a GPU (graphics processor unit) 11b, a DSP (digital signal processor) 11c, a VRAM 11d, and the internal main memory 11e. These component 11a, 11b, 11c, 11d and 11e are connected to each other via an internal bus not shown.

The GPU 11b, which is a part of rendering means, generates an image in accordance with a graphics command (draw command) from the CPU 10. The VRAM 11d stores data (such as polygon data and texture data) necessary for the GPU 11b to execute the graphics command. When an image is generated, the GPU 11b generates image data by using the data stored in the VRAM 11d.

The DSP 11c functions as an audio processor, and generates audio data by using sound data and sound waveform (tone quality) data stored in the internal main memory 11e and the external main memory 12.

The image data and the audio data generated as described above, are read by the AV-IC 15. The AV-IC 15 outputs the read image data to the television set 2 via an AV connector 16, and also outputs the read audio data to a speaker 2a of the television set 2. Thus, the image is displayed on the television set 2, and the sound is outputted from the speaker 2a.

The input/output processor (I/O processor) 11a executes data reception and transmission among the components connected thereto and data downloading from an external apparatus. The input/output processor 11a is connected to the flash memory 17, a wireless communication module 18, the wireless controller module 19, an extension connector 20, and a memory card connector 21. To the wireless communication module 18, an antenna 22 is connected, and to the wireless controller module 19, an antenna 23 is connected.

The input/output processor 11a is connected to a network via the wireless communication module 18 and the antenna 22 so as to communicate with other game apparatuses or various servers connected to the network. The input/output processor 11a accesses the flash memory 17 at regular intervals so as to detect for data to be transmitted to the network. When the data to be transmitted is detected, the data is transmitted to the network via the wireless communication module 18 and the antenna 22. Further, the input/output processor 11a receives, via the network, the antenna 22 and the wireless communication module 18, data transmitted from the other game apparatuses or data downloaded from a download server, and stores the received data in the flash memory 17. The CPU 10 executes the game program so as to read the data stored in the flash memory 17, thereby using the read data on the game program. The flash memory 17 may store not only the data transmitted and received among the game apparatus 3, and other game apparatuses or the various servers, but also saved data (result data or intermediate step data of the game) of a game played with the game apparatus 3.

Further, the input/output processor 11a receives the operation data transmitted from the controller 5 via the antenna 23 and the wireless controller module 19, and (temporarily) stores the operation data in a buffer area of the internal main memory 11e or the external main memory 12.

Further, the input/output processor 11a is connected to the extension connector 20 and the memory card connector 21. The extension connector 20, which is a connector used for interface such as a USB and an SCSI, allows communication with the network, without using the wireless communication module 18, by connecting, to the extension connector 20, a media such as an external storage medium, or a peripheral device such as another controller, or a wired communication connector. The memory card connector 21 is a connector for connecting to the memory card connector 21 the external storage medium such as a memory card. For example, the input/output processor 11a accesses the external storage medium via the extension connector 20 or the memory card connector 21, so as to store data in the external storage medium or read data from the external storage medium.

The game apparatus 3 includes a power button 24, a reset button 25, and an eject button 26. The power button 24 and the reset button 25 are connected to the system LSI 11. When the power button 24 is pressed so as to be ON, the power is supplied to the respective components of the game apparatus 3 via an AC adapter which is not shown. Further, when the reset button 25 is pressed, the system LSI 11 restarts a boot program of the game apparatus 3. The eject button 26 is connected to the disc drive 14. When the eject button 26 is pressed, the optical disc 4 is ejected from the disc drive 14.

(Structure of Controller 5)

Figure 3:
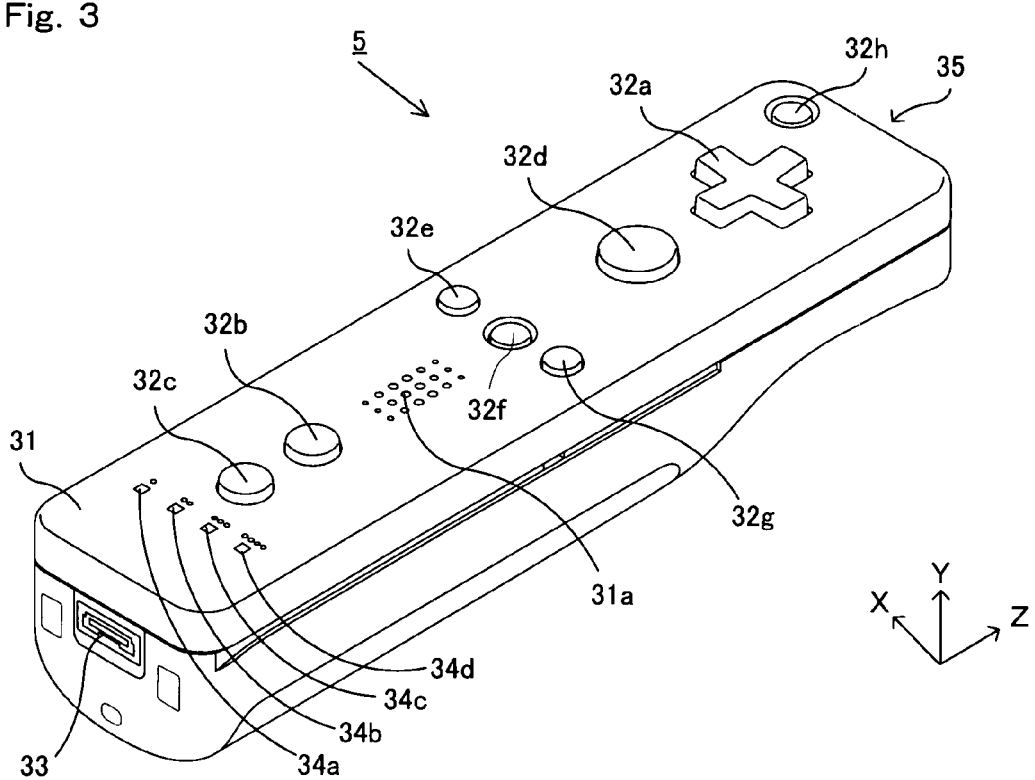
FIG. 3 is a perspective view illustrating an outer appearance of a controller 5.
Figure 4:
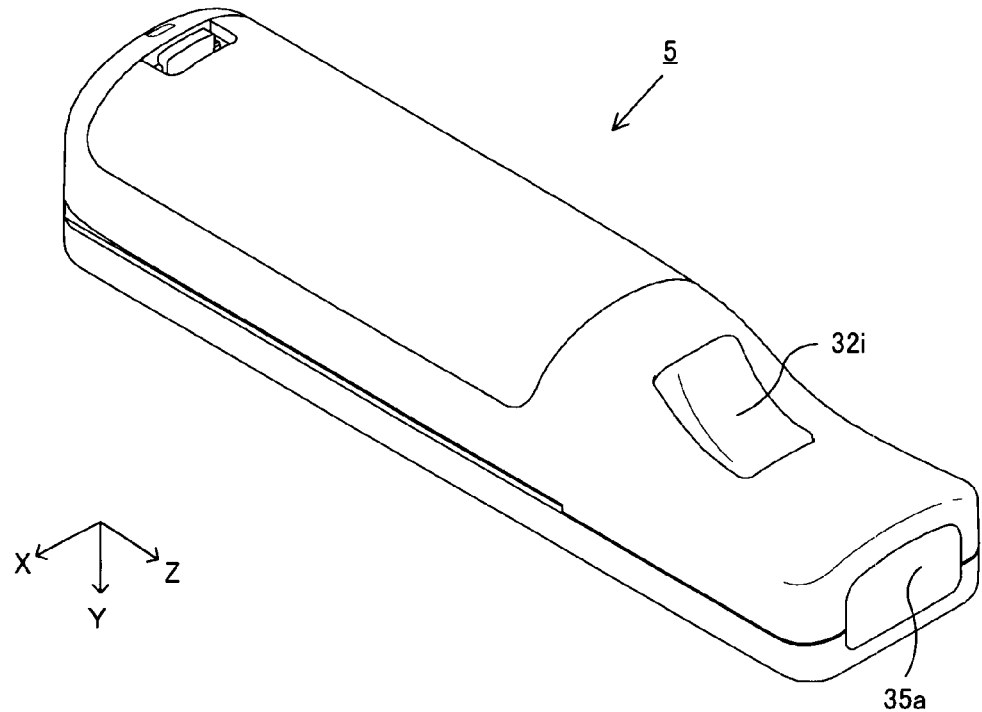
FIG. 4 is a perspective view illustrating an outer appearance of the controller 5.

Next, with reference to FIGS. 3 to 7, the controller 5 will be described. Each of FIGS. 3 and 4 is a perspective view illustrating an outer appearance of the controller 5. FIG. 3 is a perspective view of the controller 5 as viewed from the top rear side thereof. FIG. 4 is a perspective view of the controller 5 as viewed from the bottom front side thereof.

As shown in FIGS. 3 and 4, the controller 5 includes a housing 31 formed by plastic molding or the like. The housing 31 has a generally parallelepiped shape extending in a longitudinal direction (Z-axis direction shown in FIG. 3) from front to rear. The overall size of the housing 31 is small enough to be held by one hand of an adult or even a child. An game operation can be performed when a player presses a button on the controller 5 and changes a position and an attitude of the controller 5 by moving the controller 5.

The housing 31 includes a plurality of operation buttons. As shown in FIG. 3, a cross button 32a, a first button 32b, a second button 32c, and an A button 32d, a minus button 32e, a home button 32f, a plus button 32g and a power button 32h are provided on the top surface of the housing 31. On the other hand, as shown in FIG. 4, on a bottom surface of the housing 31, a recessed portion is provided. A B button 32i is provided on the rear slope surface of the recessed portion. The operation buttons 32a, 32b, 32c, 32d, 32e, 32f, 32g, 32h, and 32i are assigned with various functions in accordance with the game program executed by the game apparatus 3, as necessary. The power button 32h is used for remotely controlling a power of a body of the game apparatus 3 to be On or OFF. The home button 32f and the power button 32h each has a top surface thereof buried in the top surface of the housing 31. Therefore, a player is prevented from inadvertently pressing the home button 32f and the power button 32h.

On the rear surface of the housing 31, a connector 33 is provided. The connector 33 is used for connecting the controller 5 to another device (for example, another controller).

On the top surface of the housing 31, a plurality (four in FIG. 3) of LEDs 34a, 34b, 34c, and 34d are provided in the vicinity of the rear thereof. The controller 5 is assigned with a controller type (number) so as to be distinguishable from the other controllers 5. For example, the LEDs 34a, 34b, 34c, and 34d are used for informing a player of the controller type which is currently set to controller 5 that he or she is using, or informing a player of a remaining battery charge of the controller 5. Specifically, when a game is played using the controller 5, one of the plurality of LEDs 34a, 34b, 34c, and 34d corresponding to the controller type is lit up.

The controller 5 includes an imaging information calculation section 35 (FIG. 6), and a light incident surface 35a of the imaging information calculation section 35 is provided on the front surface of the housing 31, as shown in FIG. 4. The light incident surface 35a is formed by a material which allows at least an infrared light from the markers 6R and 6L to pass therethrough. A sound hole 31a for outputting a sound from a speaker 49 (FIG. 5) included in the controller 5 is provided between the first button 32b and the home button 32f on the top surface of the housing 31.

Figure 5:
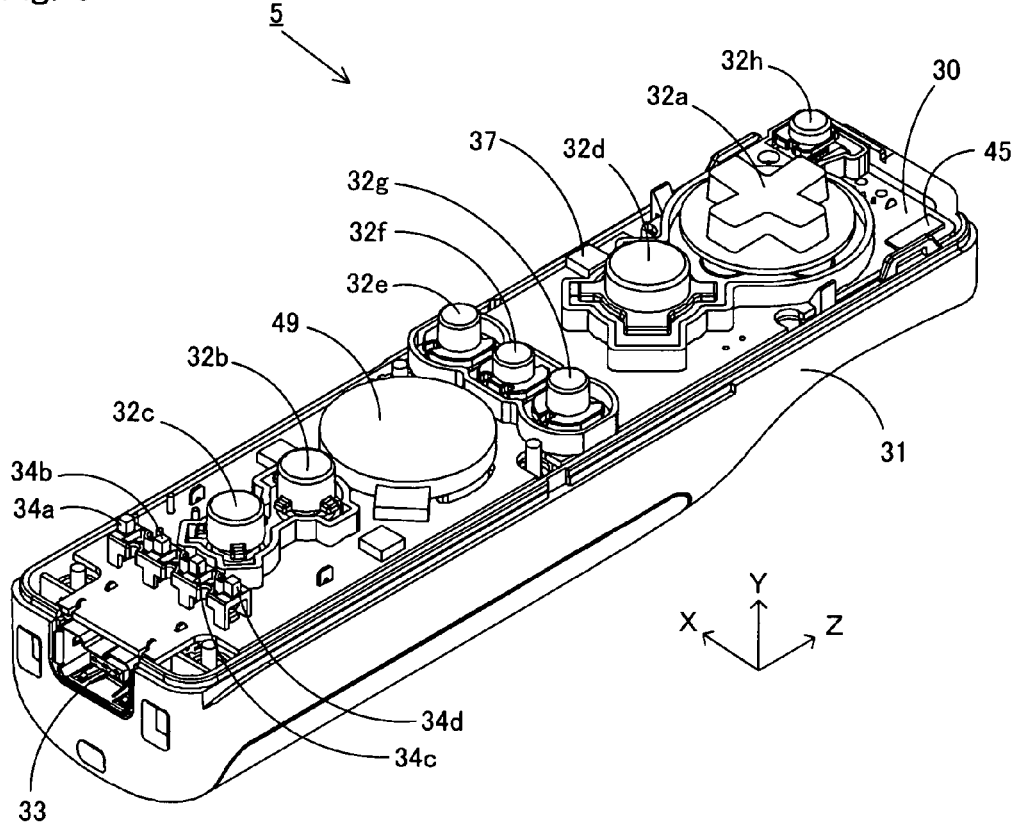
FIG. 5 is a diagram illustrating an internal structure of the controller 5.
Figure 6:
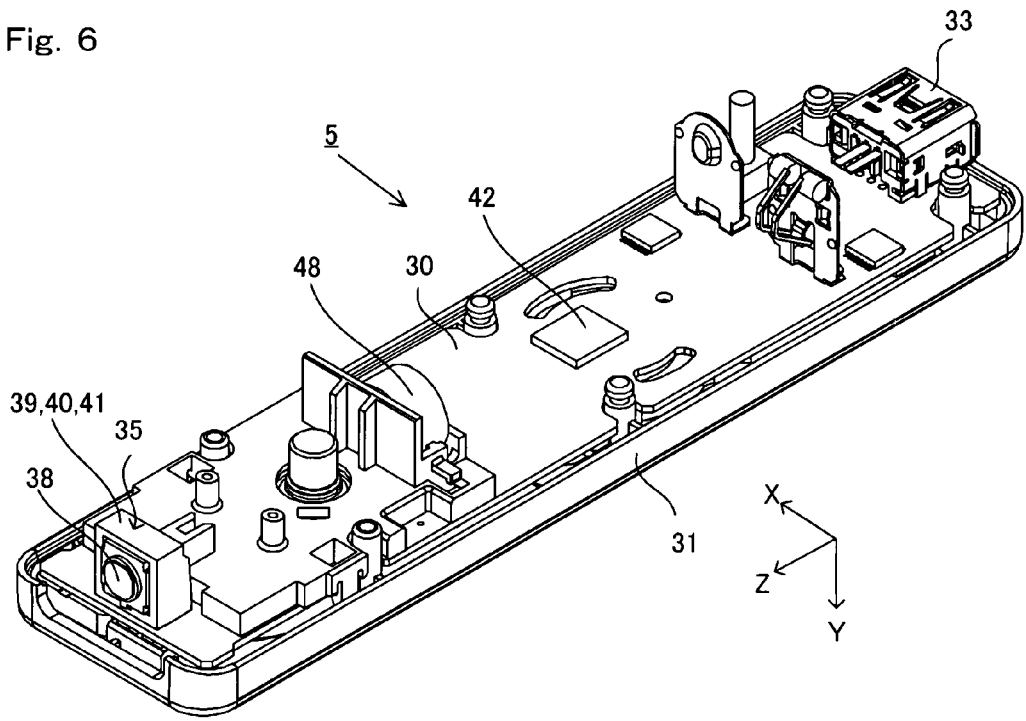
FIG. 6 is a diagram illustrating an internal structure of the controller 5.

With reference to FIGS. 5 and 6, an internal structure of the controller 5 will be described. Each of FIGS. 5 and 6 is a diagram illustrating the internal structure of the controller 5. FIG. 5 is a perspective view illustrating a state where an upper casing (a part of the housing 31) of the controller 5 is removed. FIG. 6 is a perspective view illustrating a state where a lower casing (a part of the housing 31) of the controller 5 is removed. FIG. 6 is a perspective view illustrating a reverse side of a substrate 30 shown in FIG. 5.

As shown in FIG. 5, the substrate 30 is fixed inside the housing 31. On a top main surface of the substrate 30, the operation buttons 32a, 32b, 32c, 32d, 32e, 32f, 32g and 32h, the LEDs 34a, 34b, 34c, and 34d, an acceleration sensor 37, an antenna 45, the speaker 49 and the like are provided. These elements are connected to a microcomputer 42 (see FIG. 6) via lines (not shown) formed on the substrate 30 and the like. In the present embodiment, the acceleration sensor 37 is provided off the center of the X-axis of the controller 5. Accordingly, a movement of the controller rotating about the Z-axis is readily calculated. Further, the acceleration sensor 37 is provided in front of the longitudinal (Z-axis direction)

center of the controller 5. Further, the controller 5 having a wireless module 44 (FIG. 7) and an antenna 45 functions as a wireless controller.

As shown in FIG. 6, at a front edge of a bottom main surface of the substrate 30, the imaging information calculation section 35 is provided. The imaging information calculation section 35 includes an infrared filter 38, a lens 39, the image pickup element 40 and an image processing circuit 41 located in order, respectively, from the front surface of the controller 5 on the bottom main surface of the substrate 30.

On the bottom main surface of the substrate 30, the microcomputer 42 and a vibrator 48 is provided. The vibrator 48 may be, for example, a vibration motor or a solenoid, and is connected to the microcomputer 42 by a wiring formed on the substrate 30 and the like. The controller 5 is vibrated by actuating the vibrator 48 in accordance with an instruction from the microcomputer 42, and the vibration is conveyed to the player's hand holding the controller 5. Thus, a so-called vibration-feedback game is realized. In the present embodiment, the vibrator 48 is positioned slightly in front of the longitudinal center of the housing 31. That is, the vibrator 48 is provided not at the center of the controller 5 but in the vicinity of the edge thereof, and therefore the vibration of the vibrator 48 allows a vibration of the whole controller 5 to be enhanced. The connector 33 is provided at the rear edge of the bottom main surface of the substrate 30. In addition to the elements shown in FIGS. 5 and 6, the controller 5 includes a quartz oscillator for generating a reference clock of the microcomputer 42, an amplifier for outputting an audio signal to the speaker 49, and the like.

The shape of the controller 5, the shapes of the operation buttons, the number and the setting position of each of the acceleration sensor and the vibrator, and the like, which are shown in FIGS. 3 to 6, are only examples. Needless to say, even when the shape of the controller 5, the shapes of the operation buttons, the number and the setting position of each of the acceleration sensor and the vibrator are different from those described in the example, the present invention can be realized. Further, although in the present embodiment the imaging direction of the image pickup means is Z-axis positive direction, the imaging direction may be any other direction. That is, the position (the light incident surface 35a of the imaging information calculation section 35) at which the controller 5 has the imaging information calculation section 35 mounted therein may not necessarily be the front surface of the housing 31. The imaging information calculation section 35 may be provided on any other surface of the controller 5 at which a light can be received from the outside of the housing 31.

Figure 7:
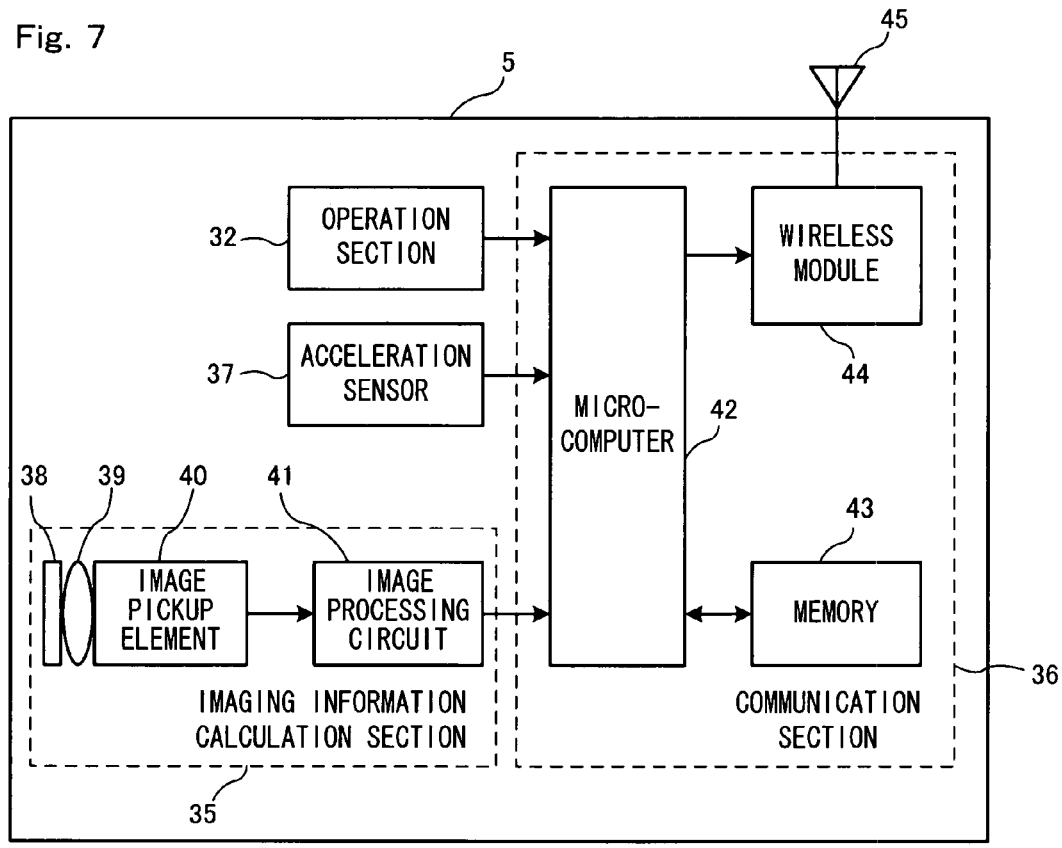
FIG. 7 is a block diagram illustrating a structure of the controller 5.

FIG. 7 is a block diagram illustrating the structure of the controller 5. The controller 5 includes the operation section 32 (the respective operation buttons 32a, 32b, 32c, 32d, 32e, 32f, 32g, 32h, and 32i), the connector 33, the imaging information calculation section 35, the communication section 36, and the acceleration sensor 37. The controller 5 transmits, as operation data, data indicating a content of an operation performed on the controller 5, to the game apparatus 3.

The operation section 32 includes the respective operation buttons 32a, 32b, 32c, 32d, 32e, 32f, 32g, 32h, and 32i as describe above, and transmits, to the microcomputer 42 of the communication section 36, operation button data indicating an input state of each of the operation buttons 32a, 32b, 32c, 32d, 32e, 32f, 32g, 32h, and 32i (that is, input state as to whether or not each of the operation buttons 32a, 32b, 32c, 32d, 32e, 32f, 32g, 32h, and 32i is pressed).

The imaging information calculation section 35 is a system for analyzing image data taken by the image pickup means and determining the position of the center of gravity, the size and the like of an area having a high brightness in the image. The imaging information calculation section 35 has, for example, a maximum sampling period of about 200 frames/sec., and therefore can trace and analyze even a relatively fast motion of the controller 5.

The imaging information calculation section 35 includes the infrared filter 38, the lens 39, the image pickup element 40 and the image processing circuit 41. The infrared filter 38 allows only infrared light to pass therethrough, among light incident on the front surface of the controller 5. The lens 39 collects the infrared light which has passed through the infrared filter 38 and outputs the infrared light to the image pickup element 40. The image pickup element 40 is a solid-state image pick-up device such as, for example, a CMOS sensor or a CCD sensor. The image pickup element 40 receives the infrared light collected by the lens 39 so as to output an image signal. The marker 6R and the marker 6L of the marker section 6 positioned in the vicinity of the display screen of the television set 2 each includes an infrared LED for outputting an infrared light forward from the television set 2. Accordingly, the infrared filter 38 allows the image pickup element 40 to receive only the infrared light which has passed through the infrared filter 38 and generate image data, so that images of the marker 6R and the marker 6L can be taken with enhanced accuracy. In the following description, an image taken by the image pickup element 40 is referred to as a taken image. The image data generated by the image pickup element 40 is processed by the image processing circuit 41. The image processing circuit 41 calculates a position of an imaging target (marker 6R and marker 6L) in the taken image. Hereinafter, a coordinate point indicating the calculated position of the marker is referred to as "marker coordinate point". The image processing circuit 41 outputs data (marker coordinate point data) of the marker coordinate point to the microcomputer 42 of the communication section 36. The microcomputer 42 transmits the marker coordinate point data to the game apparatus 3 as operation data. The marker coordinate point changes in accordance with a direction (attitude) and a position of the controller 5, and therefore the game apparatus 3 can use the marker coordinate point to calculate the direction and the position of the controller 5.

The acceleration sensor 37 detects for an acceleration (including gravitational acceleration) of the controller 5. Specifically, the acceleration sensor 37 detects for a force (including gravity) applied to the controller 5. The acceleration sensor 37 detects for a value representing an acceleration (linear acceleration) in the linear direction along a sensing axis direction among accelerations applied to the detection section of the acceleration sensor 37. In the present embodiment, the acceleration sensor 37 detects for a linear acceleration in each of three axial directions, that is, the up/down direction (Y-axis direction shown in FIG. 3), the left/right direction (X-axis direction shown in FIG. 3), and the forward/backward direction (Z-axis direction shown in FIG. 3) relative to the controller 5. The detected acceleration is represented as a three-dimensional vector (AX, AY, AZ) of an XYZ coordinate system defined relative to the controller 5. Data (acceleration data) representing an acceleration detected by the acceleration sensor 37 is outputted to the communication section 36. The acceleration detected by the acceleration sensor 37 changes in accordance with a direction (attitude) and a movement of the controller 5, and therefore the game apparatus 3 can calculate the direction and the movement of the controller 5 by using the acceleration data.

The communication section 36 includes the microcomputer 42, a memory 43, the wireless module 44 and the antenna 45. The microcomputer 42 controls the wireless module 44 for wirelessly transmitting, to the game apparatus 3, data acquired by the microcomputer 42 while using the memory 43 as a storage area during the processing.

Data (operation button data, marker coordinate point data, and acceleration data) outputted to the microcomputer 42 from the operation section 32, the imaging information calculation section 35, and the acceleration sensor 37 are temporarily stored in the memory 43. The respective data are transmitted to the game apparatus 3 as the operation data. At a time of transmission to the wireless controller module 19 of the game apparatus 3, the microcomputer 42 outputs, to the wireless module 44, the operation data stored in the memory 43. The wireless module 44 uses, for example, the Bluetooth (registered trademark) technology to modulate the operation data onto a carrier wave of a predetermined frequency, and radiates the low power radio wave signal from the antenna 45. Thus, the operation data is modulated onto the low power radio wave signal by the wireless module 44 and transmitted from the controller 5. The wireless controller module 19 of the game apparatus 3 receives the low power radio wave signal. The received low power radio wave signal is demodulated or decoded so as to allow the game apparatus 3 to acquire the operation data. Based on the acquired operation data and the game program, the CPU 10 of the game apparatus 3 performs the game process. The wireless transmission from the communication section 36 to the wireless controller module 19 is performed periodically at predetermined time intervals. Since game process is generally performed at a cycle of ⅟60 sec. (one frame time), the transmission is preferably performed at a cycle of a time period shorter than the one frame time. The communication section 36 of the controller 5 outputs the respective operation data to the wireless controller module 19 of the game apparatus 3 once every ⅟200 seconds, for example.

Figure 8:
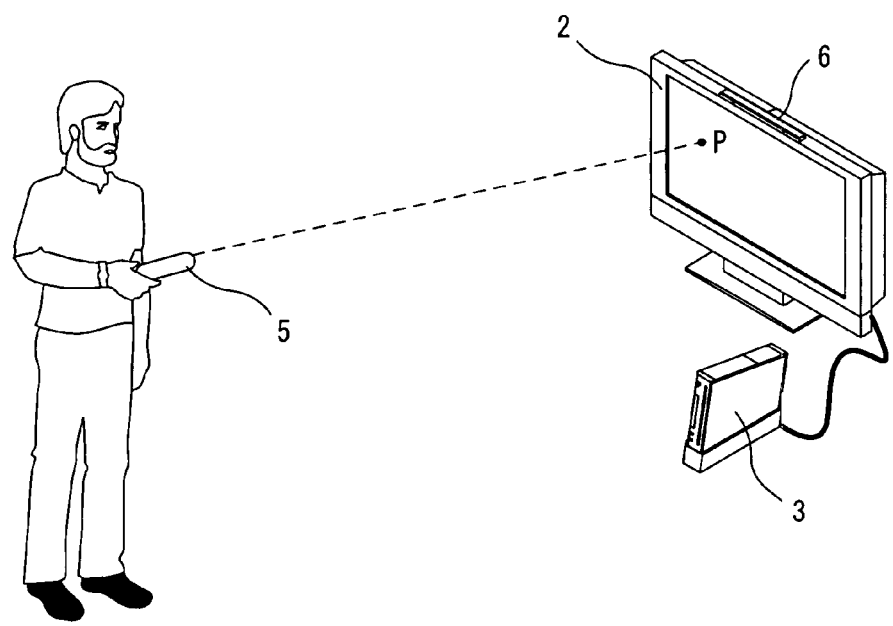
FIG. 8 is a diagram illustrating a state where a game operation is performed using the controller 5.

When a player uses the controller 5, the player is allowed to perform an operation of designating any position on the screen by using the controller 5, and an operation of moving the controller 5 as well as a conventional typical game operation of pressing the respective operation buttons. FIG. 8 is a diagram illustrating a state where the controller 5 is used to perform a game operation. In the present embodiment, as shown in FIG. 8, a player is allowed to perform a game operation of moving the controller 5 (specifically, changing an attitude of the controller 5), and a game operation of designating a position P on the screen of the television set 2 by using the controller 5.

The position P shown in FIG. 8 is a position designated on the screen by using the controller 5, and the position P is ideally a position at which a straight line extending from the front edge of the controller 5 in the longitudinal direction intersects the screen of the television set 2. As described below in detail, the game apparatus 3 calculates the position P based on the marker coordinate point described above. However, the position need not be exactly calculated by the game apparatus 3, and the game apparatus 3 may calculate a position in the vicinity of a designated position. Hereinafter, a position (position P shown in FIG. 8) designated on the screen by using the controller 5 is referred to as "a pointing position".

(Outline of Process Performed by Game Apparatus)

Hereinafter, with reference to FIGS. 9 and 10, an outline of the game process performed by the game apparatus 3 will be described. In the following description, the game process will be described by using an exemplary game in which a player shoots an object representing a target in a virtual three-dimensional space.

Figure 9:
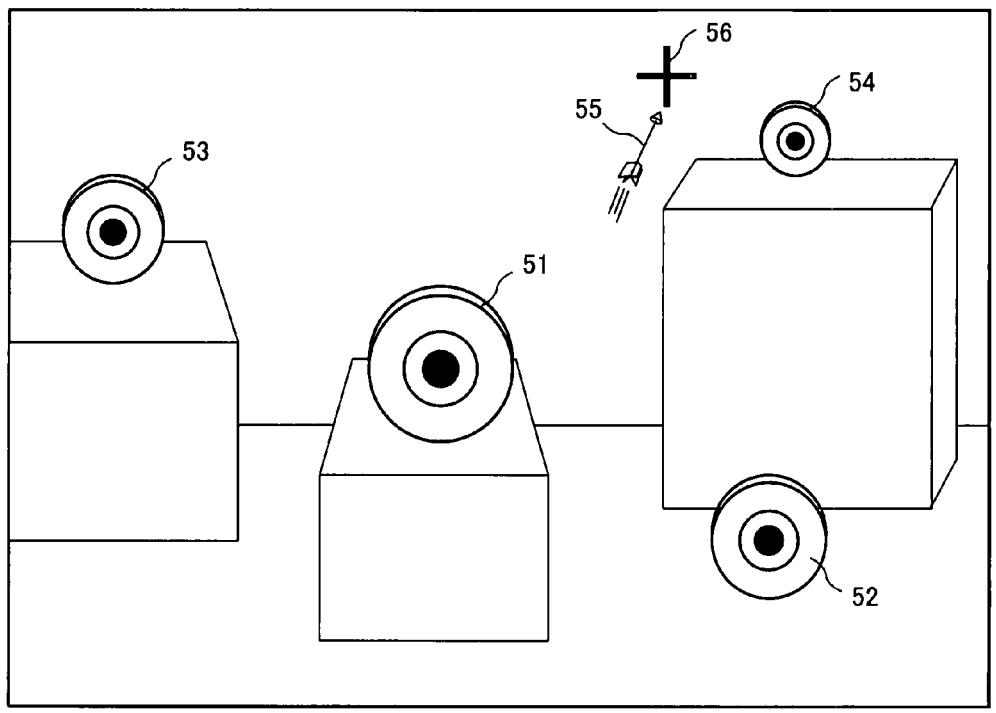
FIG. 9 is a diagram illustrating an exemplary game screen displayed through a game process according to an embodiment of the present invention.

FIG. 9 is a diagram illustrating an exemplary game screen displayed through the game process according to the present embodiment. As shown in FIG. 9, target objects 51 to 54, and an arrow object 55 are positioned in a virtual three-dimensional space (game space) structured in a game of the present embodiment. Further, an image representing an aim 56 as well as an image representing the three-dimensional space is displayed on the screen of the television set 2. The game of the present embodiment is a shooting game in which a moving object such as the arrow object 55 is shot so as to hit the target objects 51 to 54.

The target objects 51 to 54 are objects representing shooting targets. In FIG. 9, the target objects 51 to 54 are objects representing targets. However, the target object may have any size and shape. For example, in another embodiment, the target object may be an object representing a monster. Further, the target objects 51 to 54 may move in the game space.

The arrow object 55 is shot from a weapon object and typifies a moving object which moves in the game space. In FIG. 9, a bow object (a bow object 58 shown in FIG. 10) is used as the weapon object, and the arrow object 55 is used as the moving object. However, any object may be used as each of the weapon object and the moving object. For example, an object representing a gun may be used as the weapon object, and an object representing a bullet may be used as the moving object. In the present embodiment, a player object is allowed to use a plurality of weapon objects. That is, a player is allowed to select one of a plurality of weapon objects so as to perform shooting.

The aim 56 represents a mark at which the arrow object 55 is shot. The aim 56 indicates a direction (shooting direction) in which an arrow object is shot. Specifically, the arrow object 55 is shot from a position of the weapon object in the three-dimensional game space toward a position (in the game space) designated by the aim 56. Further, in the present embodiment, a position of the aim 56 in a two-dimensional game image is set to the pointing position. Therefore, in the present embodiment, the direction in which the arrow object 55 is shot is determined in accordance with a position (pointing position) designated on the screen by using the controller 5, and therefore a player moves the controller 5 so as to change a position designated on the screen by using the controller 5, so that it is possible to control the direction in which the arrow object 55 is shot.

In FIG. 9, a bow object from which the arrow object 55 is shot and a player character (see FIG. 10) holding the bow object are not displayed. However, in another embodiment, the bow object and the player character may be displayed.

Further, in the present embodiment, as shown in FIG. 9, an image of the game space is generated such that the direction in which the arrow object 55 is shot is a direction from the front side toward the far side in the game space on the screen. Specifically, the line-of-sight direction of the virtual camera is defined in the game space such that the line-of-sight direction is substantially the same as the direction in which the arrow object 55 is shot (that is, such that an angle between the line-of-sight direction and the direction in which the arrow object 55 is shot represents an acute angle).

When a player plays the shooting game, the player controls the controller 5 so as to position the aim 56 at a desired position, and presses, for example, the A button 32*d*, thereby issuing an instruction for shooting. The arrow object 55 is shot from the bow object in response to the instruction for shooting. Specifically, the arrow object 55 is generated and the generated arrow object 55 is moved from the position of the bow object toward the shooting direction in the game space.

Whether or not the arrow object 55 shot in response to the instruction for shooting has hit any of the target objects 51 to 54 is determined by using a contact determination area defined for each of the objects 51 to 55. Specifically, whether or not the arrow object 55 has hit any of the target objects 51 to 54, that is, whether or not the arrow object 55 contacts any of the target objects 51 to 54 is determined based on whether or not the contact determination area defined for the arrow object 55 contacts any of the contact determination areas defined for the respective target objects 51 to 54. The contact determination area represents an area defined for each object so as to determine whether or not two objects contact each other. In the present embodiment, the contact determination area has a spherical shape, and at least one spherical contact determination area is defined for each one object. Further, a position of the contact determination area defined for an object is determined in accordance with a position of the object. Whether or not the objects contact each other is determined (that is, a contact determination process is performed) each time a game image is generated, that is, for each frame.

Figure 10:
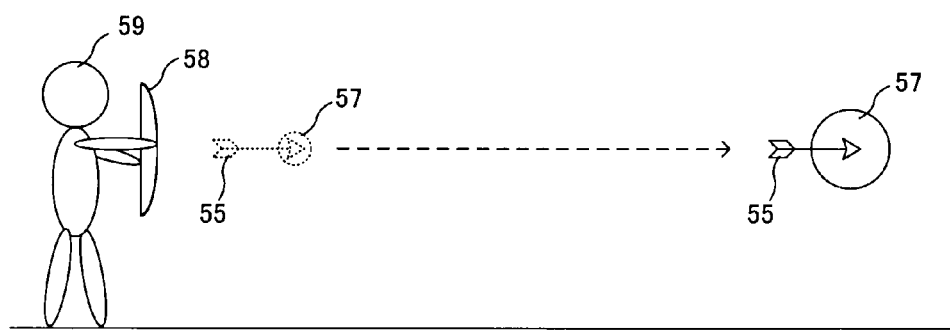
FIG. 10 is a diagram illustrating a state where a contact determination area of an arrow object is changed.

FIG. 10 is a diagram illustrating a state where the contact determination area of the arrow object is changed. FIG. 10 shows a game space as viewed from the direction perpendicular to the moving direction in which the arrow object 55 moves. In FIG. 10, the arrow object 55 which is at a position immediately following a position at which the arrow object 55 has been shot by the bow object 58 held by a player object 59 and a contact determination area 57 defined for the arrow object 55 at the immediately following position are represented by dotted lines, and the arrow object 55 having been moved over a certain distance after the arrow object 55 has been shot and the contact determination area 57 for the arrow object 55 having been moved over the certain distance are represented by solid lines.

As shown in FIG. 10, the contact determination area 57 of the arrow object 55 at the position immediately following the position at which the arrow object 55 has been shot has a spherical shape of a relatively small radius, where as the contact determination area 57 of the arrow object 55 having been moved over the certain distance after the arrow object 55 has been shot has a spherical shape of a relatively large radius. As described above, in the present embodiment, the contact determination area 57 of the arrow object 55 is set such that the longer a distance over which the arrow object 55 has been moved, the larger the contact determination area 57 of the arrow object 55 is. Therefore, in the present embodiment, the more easily the arrow object 55 can contact the target object, the longer the distance over which the arrow object 55 is moved from a position (shooting position) at which the arrow object 55 has been shot. That is, the longer the distance over which the arrow object 55 is moved from the shooting position, the more easily an arrow hits a target.

In the shooting game (see FIG. 9) in which the line-of-sight direction of the virtual camera is substantially the same as the direction in which the arrow object is shot, the target object (for example, the target object 54 shown in FIG. 9) which is far from the shooting position is displayed so as to be smaller than the target object (for example, the target object 51 shown in FIG. 9) which is near the shooting position, so that it is difficult that the arrow object hits the target object. In the present embodiment, the longer the moving distance over which the arrow object moves, the larger the contact determination area of the arrow object is, thereby reducing difficulty level at which an arrow is shot so as to hit a target. Thus, a beginner or a player poor at playing the game is allowed to shoot an arrow so as to easily hit a target. Further, the size of the contact determination area is not large at a position near the shooting position, and therefore the game is not too easy to play, thereby appropriately setting the difficulty level of the game. Further, in another embodiment, the longer the moving distance is, the smaller the contact determination area of the arrow object is. In this case, the difficulty level of the game is increased. As describe above, according to the present invention, the contact determination area of the arrow object is changed in accordance with the moving distance over which the arrow object is moved, thereby easily changing the difficulty level of the shooting game.

Further, in the present embodiment, the contact determination area of the arrow object is changed, and therefore a processing load with which the contact determination area is changed does not depend on the number of target objects. Therefore, the processing load of a system does not greatly change depending on the number of target objects, so that the game apparatus 3 can perform the game process with constant processing load.

(Detailed Game Process)

Figure 11:
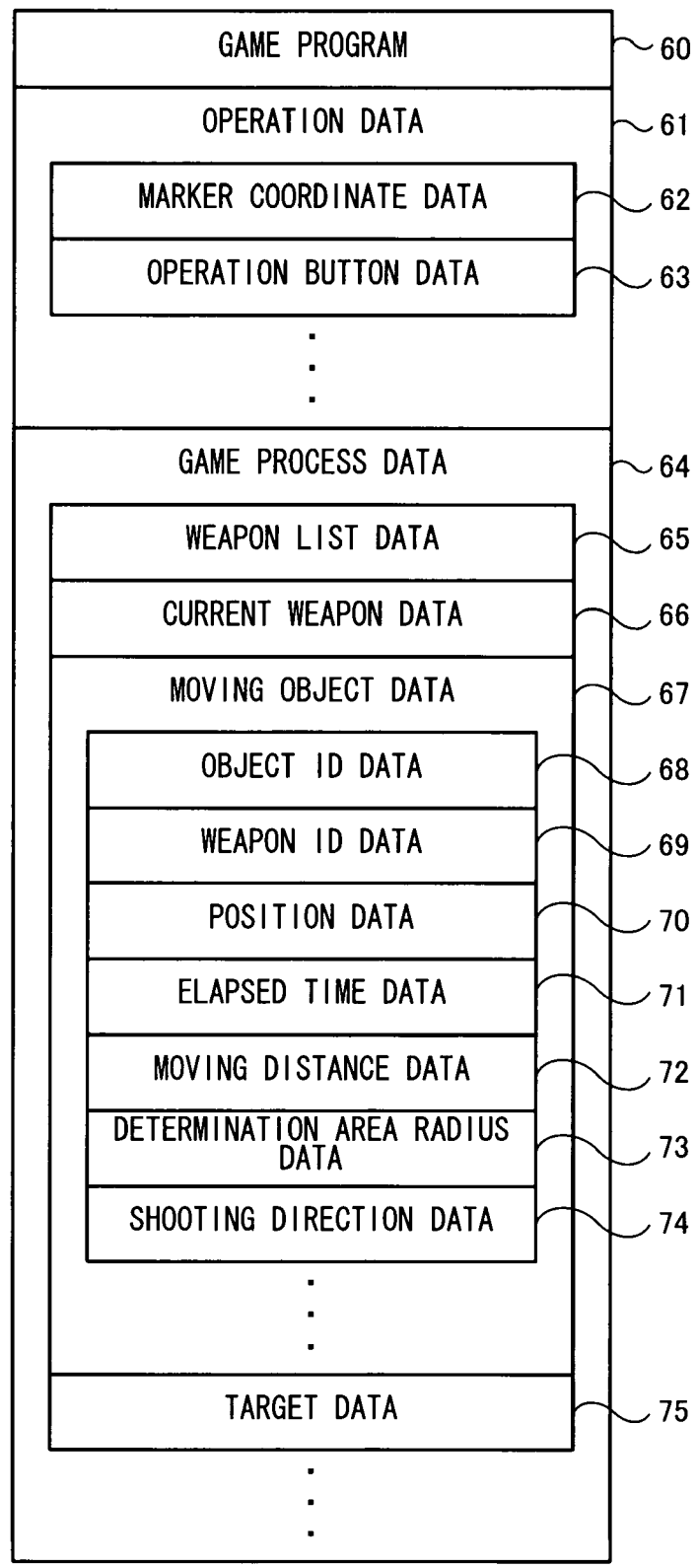
FIG. 11 is a diagram illustrating main data stored in a main memory of the game apparatus 3.

Hereinafter, with reference to FIGS. 11 to 15, the game process according to the present embodiment will be described in detail. Initially, data used in the game process according to the present embodiment will be described. FIG. 11 is a diagram illustrating main data stored in the main memory (the external main memory 12 or the internal main memory 11e) of the game apparatus 3. As shown in FIG. 11, a game program 60, operation data 61, game process data 64 and the like are stored in the main memory.

The game program 60 is a program for causing the CPU 10 of the game apparatus 3 to perform the game process (FIG. 14) described below. The game program 60 is partially or entirely loaded from the optical disc 4 at an appropriate time after the game apparatus 3 is powered on and is stored in the main memory.

The operation data 61 is transmitted from the controller 5 to the game apparatus 3 and stored in the main memory. The operation data 61 includes marker coordinate point data 62 and operation button data 63. The marker coordinate point data 62 represents the marker coordinate point calculated by the imaging information calculation section 35. The operation button data 63 represents an input state of the respective operation buttons 32a, 32b, 32c, 32d, 32e, 32f, 32g, 32h, and 32i. The operation data 61 includes not only the marker coordinate point data 62 and the operation button data 63 but also acceleration data representing an acceleration vector detected by the acceleration sensor 37. As described above, the operation data is transmitted from the controller 5 to the game apparatus 3 once every 1/200 seconds, and the operation data to be stored in the main memory is also updated once every 1/200 seconds. Only the most recent operation data (having been most recently acquired) may be stored in the main memory.

The game process data 64 is used in the game process described below with reference to FIG. 14. The game process data 64 includes weapon list data 65, most recent weapon data 66, moving object data 67, and target data 75. The game process data 64 includes data necessary for the game process such as image data of various objects appearing in the game and data representing various parameters of the object, in addition to the data shown in FIG. 11.

The weapon list data 65 represents various information relating to a weapon object. In the present embodiment, a player object is allowed to use a plurality of weapons each having a difference performance. The weapon list data 65 is previously stored in the optical disc 4 together with the game program, and read from the optical disc 4 as necessary when, for example, the game is started. FIG. 12 is a diagram illustrating exemplary contents of the weapon list data 65. As shown in FIG. 12, in the present embodiment, the weapon list data 65 represents the weapon objects each associated with information indicating a weapon ID, a maximum flying distance, a speed, and a reference radius. The weapon ID represents a number, unique to a weapon object, by which the weapon object is identified. The maximum flying distance represents information indicating a maximum flying distance over which a moving object shot by the weapon object is allowed to move. The speed represents information indicating a speed (for example, a distance over which the moving object moves for each one frame time) of the moving object having been shot by the weapon object. In the present embodiment, the moving object moves at a constant speed. In another embodiment, the speed of the moving object may be gradually attenuated. In this case, in the weapon list data 65, a weapon object may be associated with an initial speed and a deceleration degree of the moving object. Further, the reference radius represents a radius of the contact determination area which is defined for the moving object at a time when the weapon object shoots the moving object.

The most recent weapon data 66 represents a weapon object being currently used. Specifically, the most recent weapon data 66 represents the weapon ID of a weapon object being currently used. In the present embodiment, a player object (a player) is allowed to use one of the various weapon objects represented by the weapon list data 65. The game apparatus 3 may allow a player to select one of the weapon objects to be used before starting the game, or may allow a player to change a weapon object to be used while playing the game.

The moving object data 67 represents various information relating to each of the moving objects positioned in the game space. FIG. 13 is a diagram illustrating exemplary contents of the moving object data 67. As shown in FIG. 13, the moving object data 67 includes object ID data 68, weapon ID data 69, position data 70, elapsed time data 71, moving distance data 72, determination area radius data 73, and shooting direction data 74, for each moving object positioned in the game space. The data 68 to 74 are associated with each other for each moving object and are stored.

The object ID data 68 is a number, unique to a moving object, by which the moving object positioned in the game space is identified. The weapon ID data represents the weapon ID of the weapon object by which the moving object is shot. The position data 70 represents a position of the moving object in the game space. The position is represented as a coordinate value used for the world coordinate system described above. The elapsed time data 71 represents a time which has elapsed after the moving object is shot. The moving distance data 72 represents a distance over which the moving object moves in the game space after the moving object has been shot. The determination area radius data 73 represents a most recent radius of the contact determination area defined for the moving object. The shooting direction data 74 represents a direction in which the moving object is shot. The direction is represented as a three-dimensional vector (unit vector) having a direction in the game space.

The target data 75 represents various information relating to a target object positioned in the game space. Specifically, the target data 75 represents a position of each target object in the game space.

Next, a game process performed by the game apparatus 3 will be described in detail with reference to FIGS. 14 and 15. FIG. 14 is a main flow chart illustrating a flow of the game process performed by the game apparatus 3. When the game apparatus 3 is powered on, the CPU 10 of the game apparatus 3 executes a boot program stored in the boot ROM not shown, so as to initialize the respective units such as the main memory. The game program stored in the optical disc 4 is loaded to the main memory, and the CPU 10 starts to execute the game program. The flow chart shown in FIG. 14 is a flow chart illustrating a process performed after the process described above is completed.

Figure 14:
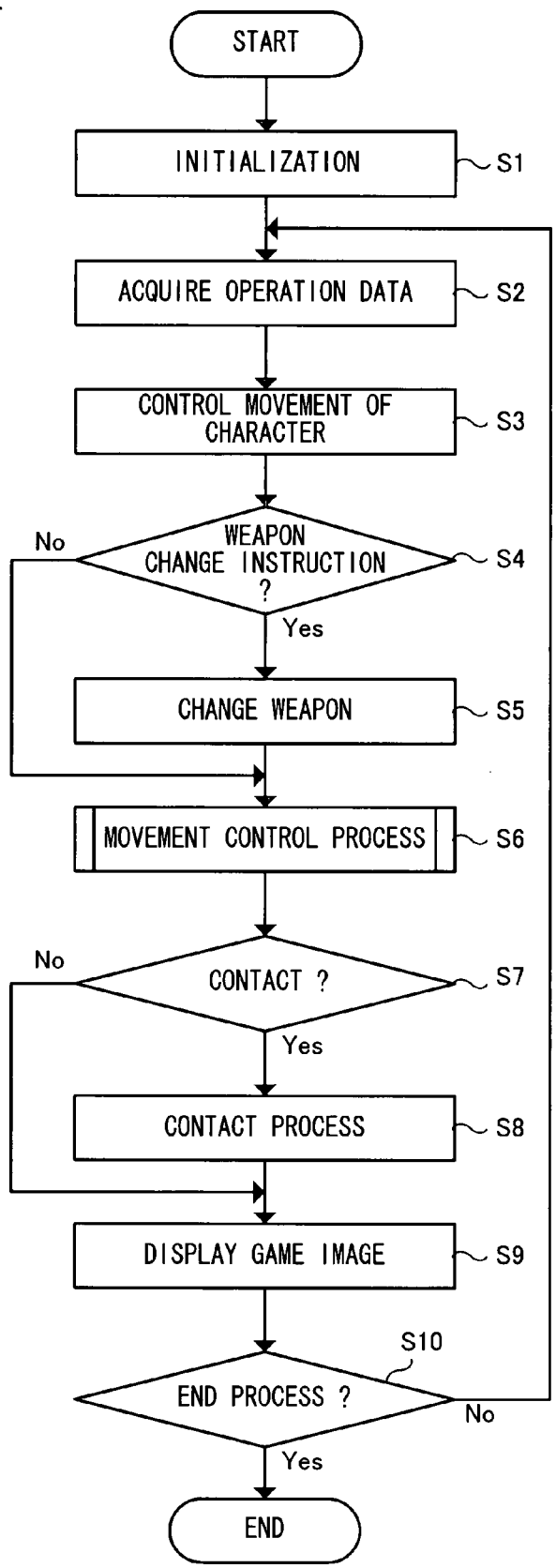
FIG. 14 is a main flow chart showing a flow of the game process performed by the game apparatus 3.

In step S1 shown in FIG. 14, the CPU 10 initially performs initialization relating to the game. Specifically, the CPU 10 loads, from the optical disc 4, data relating to a game character such as a player object, data relating to a topography object used for forming a three-dimensional game space, and the like. The CPU 10 uses the read data to form the three-dimensional space of the field, and performs a process of positioning the player object and other objects at an initial position of the field, and the like. At this time, the target data 75 representing an initial position of each target object is stored in the main memory. Further, in the present embodiment, the weapon list data 65 is read from the game program and stored in the main memory in the initialization process. Further, in the initialization process, a weapon used when the game is stared is set. Specifically, the most recent weapon data 66 representing a predetermined weapon object is stored in the main memory. In another embodiment, the game apparatus 3 may allow a player to select a weapon to be used when the game is started.

Following step S1, a process loop of steps S2 to S10 is repeated while the game is played. One process loop is performed once every one frame time (corresponding to, for example, 1/60 seconds).

In step S2, the CPU 10 acquires the operation data. That is, the operation data transmitted from the controller 5 is received by the game apparatus 3, and stored in the main memory. Therefore, the CPU 10 reads, from the main memory, the marker coordinate point data 62 and the operation button data 63 included in the operation data 61. Following step S2, step S3 is performed.

In step S3, the CPU 10 moves the object on the field. That is, the player object is moved in accordance with a player operating the controller 5, and/or the target object is moved in accordance with a predetermined algorithm. When the target object is moved, the content of the target data 75 in the main memory is updated. That is, data representing a position of each target object having been moved is stored as the target data 75 in the main memory. Following step S3, step S4 is performed.

In step S4, the CPU 10 determines whether or not a player issues a weapon change instruction. The weapon change instruction is an instruction for changing a weapon used by a player object. In the present embodiment, a player presses a predetermined menu display button (for example, the minus button 32e) so as to display a menu screen (step S4), and changes a weapon by selecting a weapon on the menu screen with, for example, the cross button 32a and the A button 32d (step S5 described below). Specifically, in step S4, the CPU 10 determines, in accordance with the operation button data 63 acquired in step S2, whether or not the menu display button is pressed. When the determination result of step S4 is positive, step S5 is performed. On the other hand, when the determination result of step S4 is negative, step S5 is skipped, and step S6 described below is performed.

In step S5, the CPU 10 changes a weapon used by the player object. Specifically, the CPU 10 initially displays, on the television set 2, a menu screen including a list of usable weapons. The operation data is acquired from the main memory at predetermined time intervals so as to receive an operation of selecting a weapon. When the menu screen is displayed, a player designates, on the menu screen, a desired weapon included in the list of weapons by using the cross button 32a, and simultaneously presses the A button 32d, so as to determine a weapon to be used. When the player determines the weapon, the CPU 10 changes a weapon to be used by the player object. That is, the most recent weapon data 66 representing the determined weapon is stored in the main memory. Thus, a weapon used by the player object is changed.

In step S6, the CPU 10 performs a movement control process. In the movement control process, the moving object positioned in the game space is moved and the contact determination area of the moving object is increased in accordance with the moving distance over which the moving object moves. Hereinafter, with reference to FIG. 15, the movement control process will be descried in detail.

Figure 15:
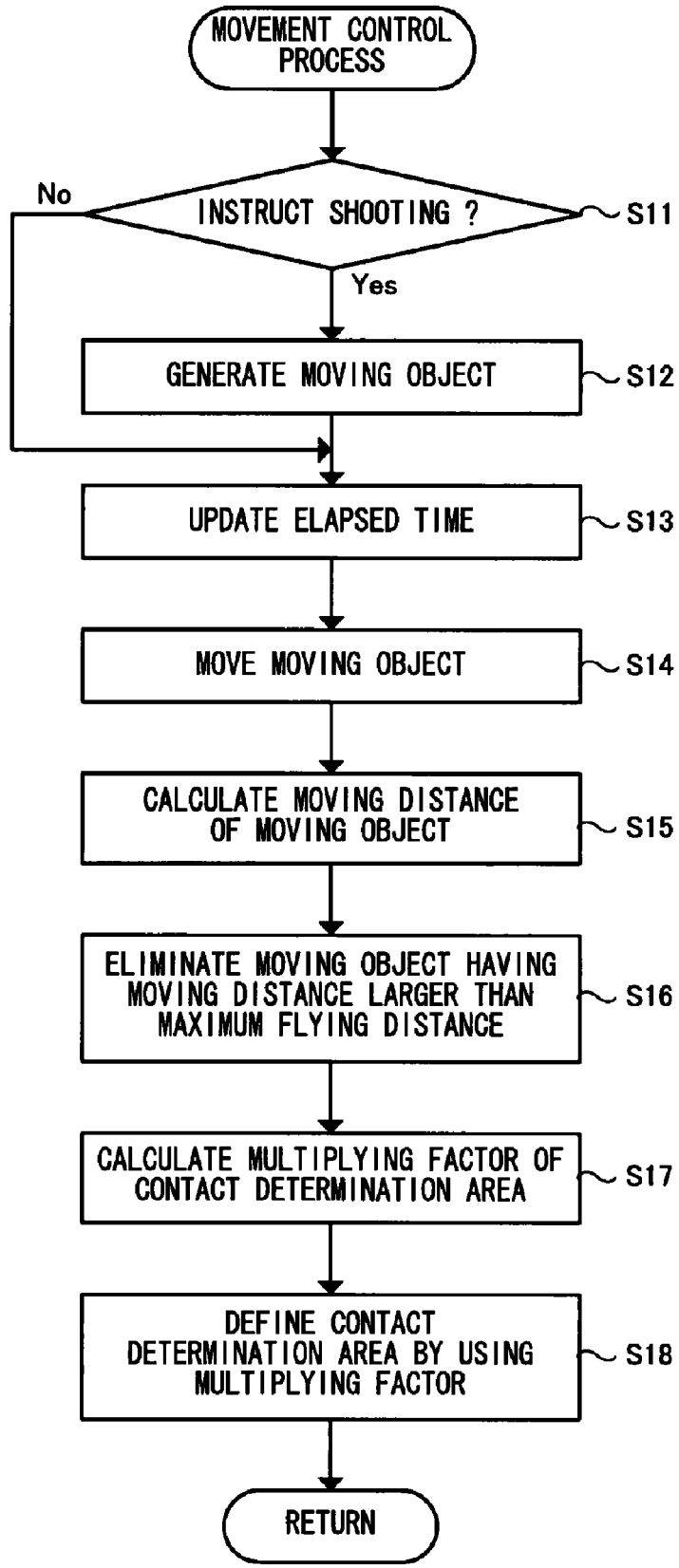
FIG. 15 is a flow chart illustrating a flow of a movement control process (step S6) shown in FIG. 14.

FIG. 15 is a flow chart illustrating a flow of the movement control process (step S6) shown in FIG. 14. In the movement control process, the CPU 10 determines, in step S11, whether or not a shooting instruction is issued. The shooting instruction is an instruction for causing the weapon object to shoot the moving object. In the present embodiment, a player can issue the shooting instruction by pressing a predetermined shooting button (for example, the A button 32d). Accordingly, the CPU 10 determines whether or not the shooting button is pressed, with reference to the operation button data 63 acquired in step S2. When the determination result of step S11 is positive, step S12 is performed. On the other hand, when the determination result of step S11 is negative, step S12 is skipped and step S13 described below is performed.

In step S12, the CPU 10 generates a new moving object. Specifically, a new moving object is positioned at a predetermined position in the vicinity of the weapon object in the game space. Further, the CPU 10 updates the content of the moving object data 67 stored in the main memory. Specifically, the object ID data, the weapon ID data, the position data, the elapsed time data, the moving distance data, the radius data, and the shooting direction data which are associated with each other are additionally stored as new one piece of moving object data 67. Hereinafter, the contents of the respective data, that is, the contents of the various information set for the new moving object will be described.

The respective various information relating to the new moving object are set in the following manner. Specifically, the object ID of the new moving object is set so as to have a number which is different from the numbers represented by the object ID data of the other moving objects already included in the moving object data 67. The weapon ID of the new moving object is set so as to have the same number as the number represented by the most recent weapon data 66. The position of the new moving object is set to a predetermined position based on the most recent position of the weapon object. The predetermined position corresponds to a position (shooting position) at which the moving object is shot. Each of the elapsed time and the moving distance of the new moving object is set to zero. The radius of the contact determination area defined for the new moving object is set so as to have a value representing a radius defined for a time at which the new moving object is shot, that is, a value representing the reference radius. The value representing the reference radius is a value representing the reference radius which is included in the weapon list data 65 and set for the weapon object which is represented by the most recent weapon data 66. Further, the shooting direction in which the new moving object is shot is determined in accordance with the pointing position designated at a time when the shooting instruction is issued.

Hereinafter, a method for calculating the pointing position will be described, and thereafter a method for determining the shooting direction will be described. The pointing position representing a position, on the screen, designated by using the controller 5 is calculated based on the marker coordinate point data 62. Specifically, the CPU 10 initially calculates a middle point between two marker coordinate points represented by the marker coordinate point data 62 stored in the main memory. A position of the middle point is represented using an xy-coordinate system used for representing a position on a plane corresponding to the taken image. In the xy-coordinate system, the upper left corner of the taken image is defined as the originating point, the downward direction thereof is defined as the y-axis positive direction, and the rightward direction thereof is defined as the x-axis positive direction. Next, the CPU 10 transforms a coordinate point representing the position of the middle point to a coordinate point represented using a coordinate system (x'y'-coordinate system) used for representing a corresponding position on the screen of the television set 2. When, in the x'y'-coordinate system, the upper left corner of the screen is defined as the originating point, the downward direction thereof is defined as the y-axis positive direction, and the rightward direction thereof is defined as the x-axis positive direction, the transformation as described above can be performed in the following manner. Specifically, a sign (plus or minus) of an x-component of the coordinate point of the middle point is changed to an opposite sign and the x-component is scaled at a predetermined rate (for example, a rate at which the length of the taken image in the x-axis direction is scaled so as to correspond to the length of the screen of the television set 2 in the x'-axis direction), thereby obtaining the x'-component of the pointing position. Further, a y-component of the coordinate point of the middle point is scaled at a predetermined rate (for example, a rate at which the length of the taken image in the y-axis direction is scaled so as to correspond to the length of the screen of the television set 2 in the y'-axis direction), thereby obtaining the y'-component of the pointing position. The position represented by the x'y'-coordinate value having been calculated as described above is used as the pointing position. Further, an exemplary method for calculating the pointing position with enhanced accuracy is as follows. Specifically, the middle point between the two marker coordinate points is rotated about the center of the taken image such that a vector connecting between the two marker coordinate points is parallel with the y-axis, and the middle point having been rotated is subjected the aforementioned transformation process. In the correction process using the rotation, even when the controller 5 is tilted, the pointing position can be accurately calculated. In the present embodiment, an image of the aim is displayed at the pointing position having been calculated.

The shooting direction is calculated based on the pointing position having been calculated as described above. Specifically, the CPU 10 initially calculates a target position based on the pointing position. The target position is a position, in the game space, corresponding to the pointing position. Further, the CPU 10 calculates, as the shooting direction, the direction from the shooting position to the target position. The data representing the shooting direction having been calculated is stored in the main memory as shooting direction data so as to be included in the moving object data 67. A vector representing the shooting direction is normalized as a unit vector, and data representing the normalized vector is stored as the shooting direction data.

In the present embodiment, the shooting direction is determined in accordance with an operation of a player designating a position on the screen by using the controller 5. However, the shooting direction may be determined in accordance with another operation performed by a player. For example, the game apparatus 3 may change the shooting direction (that is, the aim is moved on the screen) in accordance with an operation performed on the cross key 32a. Therefore, the controller 5 is not necessarily required to have the imaging information calculation section 35 and the acceleration sensor 37. The controller 5 may include only a typical operation button. Further, in another embodiment, the shooting direction (or a position of the aim) may be automatically moved by the game apparatus 3.

In step S12, a new moving object to be shot is generated, and data representing various information relating to the new moving object is added to the moving object data 67. Following step S12, step S13 is performed.

In step S13, the CPU 10 updates the elapsed time of the moving object. That is, a predetermined time is added to the elapsed time for each moving object positioned in the game space. In the present embodiment, step S13 is performed once every one frame time, and therefore the predetermine time corresponds to the one frame time. Specifically, the CPU 10 updates the content of the elapsed time data included in the moving object data 67 so as to represent a value obtained by adding only the predetermined time to the value having been most recently obtained. The CPU 10 updates the elapsed time for each moving object appearing in the game space. Following step S13, step S14 is performed.

In step S14, the CPU 10 moves the moving object. The moving object is moved at a speed for the moving object in a shooting direction for the moving object. "A shooting direction for the moving object" is a shooting direction represented by shooting direction data associated with the moving object in the moving object data 67. Further, "a speed for the moving object" is a speed associated with the weapon object corresponding to the moving object in the weapon list data 65. In step S14, all the moving objects appearing in the game space are moved. Further, the content of position data included in the moving object data 67 is updated in accordance with the moving object being moved. That is, the content of the position data is updated so as to represent a content representing a position of the moving object having been moved.

In step S14, each moving object appearing in the game space is moved. In step S14, each moving object is controlled so as to linearly move at a constant speed. However, in another embodiment, the game apparatus 3 may control the moving object so as to move in consideration of physical conditions such as the direction of gravity and air resistance. For example, the game apparatus 3 may control the speed of the moving object so as to be gradually reduced, or may control the shooting direction such that the moving path of the moving object forms a parabola. At this time, the shooting direction and the speed of the moving object may be updated for each frame. When the speed of the moving object is changed, the game apparatus 3 stores data representing a most recent speed so as to be included in the moving object data 67.

Following step S14, in step S15, the CPU 10 calculate a moving distance of the moving object. The moving distance of the moving object can be calculated by accumulating the moving distance of the moving object for each frame. Specifically, the moving distance of the moving object is calculated by adding, to the moving distance represented by the moving distance data included in the moving object data 67, the moving distance over which the moving object is moved in step S14 of the loop process being currently performed. Data representing the moving distance obtained through the calculation is stored as updated moving distance data in the main memory. In step S15, the moving distance of each moving object appearing in the game space is calculated. When the moving object linearly moves at a constant speed as in the present embodiment, the moving distance may be calculated by multiplying a speed of the moving object by the elapsed time for the moving object. Alternatively, a shooting position at which the moving object has been shot is stored, and a difference between a most recent position and the shooting position may be calculated so as to calculate the moving distance. Following step S15, step S16 is performed.

In step S16, the CPU 10 eliminates, from the game space, a moving object having the moving distance greater than the maximum flying distance. That is, the CPU 10 compares a most recent moving distance of the moving object with the maximum flying distance set for the moving object. When the moving distance is greater than the maximum flying distance, the moving object is eliminated from the game space. The most recent moving distance of the moving object is represented by moving distance data included in the moving object data 67. Further, the maximum flying distance set for the moving object can be obtained with reference to the weapon list data 65 and the weapon ID data included in the moving object data 67. That is, a value of the maximum flying distance set for the moving object is a value of the maximum flying distance associated with the weapon object corresponding to the moving object in the weapon list data 65. In step S16, the moving distance is compared with the maximum flying distance for each moving object appearing in the game space, and the moving object is eliminated based on the comparison result. When the moving object is eliminated, the CPU 10 updates the content of the moving object data 67 in accordance with the elimination. That is, data representing various information relating to the moving object having been eliminated is eliminated from the moving object data 67. Following step S16, step S17 is performed.

As in step S15 and step S16, in the present embodiment, the game apparatus 3 calculates the moving distance of the moving object in step S15 so as to eliminate the moving object from the game space, and when the moving distance having been calculated is greater than the maximum flying distance, the moving object is eliminated in step S16. In another embodiment, the game apparatus 3 may use the elapsed time for the moving object so as to eliminate the moving object from the game space. That is, the moving object having the elapsed time longer than a predetermined time limit may be eliminated from the game space. The time limit may be preset for each weapon object, as with the information of the maximum flying distance of the present embodiment.

In step S17, the CPU 10 calculates a multiplying factor of the contact determination area based on the moving distance of the moving object. Specifically, in the present embodiment, the elapsed time for the moving object is used as a variable changing in accordance with the moving object being moved. That is, in the present embodiment, the multiplying factor of the contact determination area is calculated based on the elapsed time. The multiplying factor is determined such that the greater the moving distance is, the larger the contact determination area is, that is, the longer the elapsed time is, the larger the multiplying factor is. For example, in examples shown in FIG. 12 and FIG. 13, the moving object of the object ID representing "001" and the moving object of the object ID representing "002" are shot by the weapon object of the weapon ID representing "001", and the reference radius of the weapon object represents "2". The moving object of the object ID representing "001" has its elapsed time of "1", and has its determination area radius of "2" corresponding to the reference radius, where as the moving object of the object ID representing "002" has its elapsed time of "2" and has its determination area radius of "2.1"

greater than the reference radius. Thus, the multiplying factor of the contact determination area is calculated such that the longer the elapsed time (the moving distance) is, the larger the contact determination area is. The CPU 10 calculates the multiplying factor for each moving object appearing in the game space, and stores, in the main memory, data representing each multiplying factor having been calculated. Following step S17, step S18 is performed.

In step S17, the game apparatus 3 uses the elapsed time as a variable changing in accordance with the moving object being moved so as to calculate the multiplying factor. However, in another embodiment, the multiplying factor may be calculated by using the moving distance calculated in step S15. Alternatively, for example, when a speed of the moving object is controlled so as to be gradually reduced from a predetermined initial speed in accordance with the moving object being moved, the moving distance of the moving object can be obtained based on the speed. Accordingly, in this case, the speed of the moving object may be used as the variable.

In step S18, The CPU 10 defines the contact determination area for the moving object. In the present embodiment, the contact determination area of a spherical shape defined for the moving object is generated by multiplying the reference radius of the contact determination area by the multiplying factor calculated in step S17 so as to increase the size of the determination area radius from the size of the reference radius. That is, the size of the contact determination area is calculated based on the multiplying factor calculated in step S17, and the reference radius of the contact determination area defined for the moving object. Specifically, the radius of the contact determination area having aspherical shape is calculated by multiplying the reference radius by the multiplying factor. The reference radius is obtained with reference to the weapon list data 65 and the weapon ID data included in the moving object data 67. A value of the reference radius of the contact determination area defined for the moving object is a value of the reference radius, in the weapon list data 65, associated with the weapon object corresponding to the moving object. Further, a position of the contact determination area is determined in accordance with the position of the moving object. Specifically, the position of the contact determination area is determined so as to satisfy a predetermined positional relationship between the moving object and the contact determination area. For example, when the moving object is an arrow object, the CPU 10 positions the contact determination area of a spherical shape such that the tip of the arrow is located at the center of the spherical shape. In step S18, the contact determination area is defined for each moving object appearing in the game space. Following step S18, the CPU 10 ends the movement control process shown in FIG. 15.

The process steps of steps S13 to S18 of the movement control process may be skipped when the game space does not include the moving object. That is, between step S12 and step S13, the CPU 10 may further perform a step of determining whether or not the game space includes the moving object. Only when the determination result of the step is positive, the process steps of step S13 to step S18 may be performed.

Returning to FIG. 14, in step S7, the CPU 10 determines whether or not the moving object contacts the target object. As described above, the contact determination process of step S7 is performed by using the contact determination area defined for the moving object, and the contact determination area defined for the target object. That is, when the contact determination area of the moving object contacts the contact determination area of the target object, the moving object is determined to contact the target object. In the present embodiment, the size and the shape of the contact determination area defined for the target object is fixed and does not change. The contact determination area defined for the target object may have any size and shape, and may have a cylindrical shape as well as a spherical shape. Further, one target object may have a plurality of contact determination areas.

In step S7, the CPU 10 uses a combination of the moving object and the target object so as to perform the contact determination process. In step S7, the CPU 10 performs the contact determination process for each combination of the moving object and the target object. When the moving object is determined to contact the target object for at least one combination, the moving object is determined to contact the target object. When the determination result of step S7 is positive, step S8 is performed. On the other hand, when the determination result of step S7 is negative, step S8 is skipped and step S9 is performed as described below.

In step S8, the CPU 10 performs a contact process for the combination of the moving object and the target object which are determined to contact each other in step S7. The contact process is a process of, for example, eliminating the moving object from the game space, or displaying an animation in which the target object is destroyed, or increasing the score (for a game in which the score is counted). When the moving object is eliminated, the CPU 10 updates the content of the moving object data 67 in accordance with the elimination. Specifically, data representing various information relating to the moving object having been eliminated is eliminated from the moving object data 67.

In step S9, the CPU 10 displays a game image on the television set 2. That is, the CPU 10 (and the GPU 11*b*) generates an image representing the game space as viewed from a virtual camera set in the game space. Further, an image of the aim is displayed on the screen of the television set 2 so as to be superimposed on the pointing position in the generated image. In this case, as described above, the virtual camera is set such that the line-of-sight direction of the virtual camera is the same as the most recent shooting direction.

In step S10, the CPU 10 determines whether or not the game is to be ended. The determination of step S10 is performed in accordance with, for example, whether or not a game is cleared, or whether or not a condition for game over is satisfied, or whether or not a player issues an instruction for stopping the game. When the determination result of step S10 is negative, step S2 is performed again. Thereafter, a process step of steps S2 to S10 is repeated until the game is determined to be ended in step S10. On the other hand, when the determination result of step S10 is positive, the CPU 10 ends the game process shown in FIG. 14. This is end of the description of the game process.

As described above, according to the present embodiment, the contact determination area defined for the moving object is gradually increased in accordance with the increase of the moving distance of the moving object (steps S17 and S18). Thus, the moving object can easily hit even a target object which is distanced from the shooting position, and therefore a beginner or a player poor at playing a game is allowed to shoot the moving object so as to hit the target object. Further, in the present embodiment, the size of the contact determination area of only the moving object is changed, and therefore a processing load for a process of changing the contact determination area does not depend on the number of the target objects. Accordingly, the processing load of a system does not greatly change depending on the number of the target objects, thereby stabilizing the processing load of the game apparatus 3.

In the present embodiment, the radius of the contact determination area of the moving object is calculated by using the multiplying factor based on the moving distance of the moving object. However, in another embodiment, the radius of the contact determination area may be calculated by adding a predetermined constant (for example, 0.2) to the reference radius each time a predetermined time (for example, one frame time) has elapsed. Further, the constant may be set for each type of the weapon object.

In the present embodiment, the contact determination area of the moving object has a spherical shape, and the radius thereof is changed in accordance with the moving distance. In another embodiment, the contact determination area may not necessarily have a spherical shape, and the contact determination area may have any other shape such as a cylindrical shape or an elliptical shape. Further, in another embodiment, the shape of the contact determination area of the moving object may be changed in accordance with the moving distance. For example, when the moving distance of the moving object is smaller than or equal to a predetermined value, the game apparatus 3 may set the contact determination area of the moving object so as to have the same shape as the moving object, where as when the moving distance is greater than the predetermined value, the game apparatus 3 may set the contact determination area so as to have a spherical shape. Thus, the contact determination is accurately made for an area (relatively) near the shooting position, where as the contact determination can be simplified by simplifying the process for an area (relatively) far from the shooting position. Further, the number of the contact determination areas defined for each one moving object may not necessarily be one, and a plurality of the contact determination areas may be defined for each one moving object. For example, the arrow object of the present embodiment may have arranged in line a plurality of the contact determination areas each having a spherical shape. Further, in another embodiment, the number of the contact determination areas defined for each one moving object may be changed in accordance with the moving distance of the moving object. For example, as the moving distance is increased, the number of the contact determination areas may be increased. In this case, as in the present embodiment, the moving object can easily hit the target object distanced from the shooting position.

In order to allow the moving object to more easily hit the target object, the game apparatus 3 preferably changes at least one of the size and the shape of each of the contact determination areas and the number of the contact determination areas such that the area sizes of the contact determination areas as viewed from the moving direction of the moving object are increased. The area size represents the area size of the contact determination area which is projected from the moving direction on a projection plane perpendicular to the moving direction.

Further, in another embodiment, degrees to which the size or the shape of each of the contact determination areas of the moving object or the number of the contact determination areas of the moving object are changed may be determined in accordance with the type (type of the weapon object corresponding to the moving object) of the moving object. For example, in the present embodiment, a degree to which the radius of the contact determination area is changed may be preset for each weapon object. Specifically, in the weapon list data, each weapon object is associated with the degree of change. The degree of change represents, for example, information indicating that "the multiplying factor is increased by b each time the moving distance is increased by a". In the game process, when the multiplying factor for the moving object is calculated in step S17, the CPU 10 calculates the multiplying factor in accordance with the degree of change set for each weapon object corresponding to the moving object. Thus, the degree of change can be optionally set for each weapon object, thereby adjusting, for each weapon object, a difficulty level at which the moving object thereof hits the target object.

Further, in another embodiment, at least one of the size of each contact determination area of the moving object, the shape of each contact determination area of the moving object, and the number of the contact determination areas of the moving object may be changed in accordance with not only the moving distance of the moving object but also another condition (such as a state of the game). For example, at least one of the size, the shape and the number as described above may be changed depending on whether or not the player object is moving relative to the target object. When the player object is moving relative to the target object, it is more difficult that the moving object hits the target object as compared to when the player object is not moving relative to the target object. Therefore, in the former case, for example, the contact determination area may be increased as compared to in the latter case. Further, in another embodiment, at least one of the size of each contact determination area of the moving object, the shape of each contact determination area of the moving object, and the number of the contact determination areas of the moving object may be changed in accordance with the elapsed time after the start of the game, or a remaining time before the time limit (in the case of the time limit being set). Further, at least one of the size, the shape and the number as described above may be changed depending on a skill of a player. The skill of a player may be determined based on, for example, the number of times the player played the game, a score history of the player, or the like.

As described above, the present invention is applicable to, for example, a game program and a game apparatus so as to perform, for example, a game process with a constant processing load without changing the processing load of a system depending on the number of target objects.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having stored thereon a game program executed by a computer system of a game apparatus for executing a game in which a target object is shot in a virtual three-dimensional space in accordance with an input from an input device, the computer system including one or more computer processors and the game program causing the computer system to execute:

receiving an input of an instruction for shooting;

shooting a moving object and moving the moving object in the virtual three-dimensional space;

changing at least one of a size, a shape, or a number of a contact determination area of the moving object, by using a variable changing in accordance with the movement of the moving object;

determining whether the contact determination area of the moving object contacts a contact determination area of the target object; and performing a predetermined game process when it is determined that the contact determination area of the moving object contacts the contact determination area of the target object.

2. The non-transitory computer readable storage medium according to claim 1, wherein the variable represents an elapsed time after the moving object is shot.

3. The non-transitory computer readable storage medium according to claim 2, wherein the contact determination area of the moving object is changed such that the longer the elapsed time is, the larger the contact determination area of the moving object is.

4. The non-transitory computer readable storage medium according to claim 3 wherein at least one of the size, the shape and the number of the contact determination area of the moving object is changed such that an area size of the contact determination area of the moving object as viewed from a moving direction of the moving object is increased in accordance with the variable being increased.

5. The non-transitory computer readable storage medium according to claim 4, wherein the game program causes the computer system to further execute:
   generating an image of the virtual three-dimensional space such that a direction in which the moving object is shot is a direction from a front side to a far side in the virtual three-dimensional space on a screen; and
   displaying the image by a display device.

6. The non-transitory computer readable storage medium according to claim 3, wherein the game program causes the computer system to further execute:
   generating an image of the virtual three-dimensional space such that a direction in which the moving object is shot is a direction from a front side to a far side in the virtual three-dimensional space on a screen; and
   displaying the image by a display device.

7. The non-transitory computer readable storage medium according to claim 2, wherein at least one of the size, the shape and the number of the contact determination area of the moving object is changed such that an area size of the contact determination area of the moving object as viewed from a moving direction of the moving object is increased in accordance with the variable being increased.

8. The non-transitory computer readable storage medium according to claim 7, wherein the game program causes the computer system to further execute:
   generating an image of the virtual three-dimensional space such that a direction in which the moving object is shot is a direction from a front side to a far side in the virtual three-dimensional space on a screen; and
   displaying the image by a display device.

9. The non-transitory computer readable storage medium according to claim 2, wherein
   for the size and the shape of the contact determination area of the moving object, a predetermined size and a predetermined shape are used at a time when the moving object is shot, and the game program causes the computer system to further execute:
      calculating a multiplying factor in accordance with the elapsed time after the moving object is shot; and
      transforming the contact determination area of the moving object at the time when the moving object is shot so as to be enlarged or reduced by using the multiplying factor.

10. The non-transitory computer readable storage medium according to claim 2, wherein a direction in which the moving object is shot is determined, by using the input from the input device.

11. The non-transitory computer readable storage medium according to claim 2, wherein
   a plurality of types of the moving object are shot in the virtual three-dimensional space, and
   a degree of change to which the contact determination area of the moving object is changed is determined, for each of the plurality of types of the moving object.

12. The non-transitory computer readable storage medium according to claim 1, wherein the variable represents a moving distance over which the moving object moves in the virtual three-dimensional space.

13. The non-transitory computer readable storage medium according to claim 12, wherein the contact determination area of the moving object is changed such that the greater the moving distance over which the moving object moves, the larger the size of the contact determination area of the moving object.

14. The non-transitory computer readable storage medium according to claim 13, wherein at least one of the size, the shape and the number of the contact determination area of the moving object is changed such that an area size of the contact determination area of the moving object as viewed from a moving direction of the moving object is increased in accordance with the variable being increased.

15. The non-transitory computer readable storage medium according to claim 14, wherein the game program causes the computer system to further execute:
   generating an image of the virtual three-dimensional space such that a direction in which the moving object is shot is a direction from a front side to a far side in the virtual three-dimensional space on a screen; and
   displaying the image by a display device.

16. The non-transitory computer readable storage medium according to claim 13, wherein the game program causes the computer system to further execute:
   generating an image of the virtual three-dimensional space such that a direction in which the moving object is shot is a direction from a front side to a far side in the virtual three-dimensional space on a screen; and
   displaying the image by a display device.

17. The non-transitory computer readable storage medium according to claim 12, wherein at least one of the size, the shape and the number of the contact determination area of the moving object is changed such that an area size of the contact determination area of the moving object as viewed from a moving direction of the moving object is increased in accordance with the variable being increased.

18. The non-transitory computer readable storage medium according to claim 17, wherein the game program causes the computer system to further execute:
   generating an image of the virtual three-dimensional space such that a direction in which the moving object is shot is a direction from a front side to a far side in the virtual three-dimensional space on a screen; and
   displaying the image by a display device.

19. The non-transitory computer readable storage medium according to claim 12, wherein
   for the size and the shape of the contact determination area of the moving object, a predetermined size and a predetermined shape are used at a time when the moving object is shot, and the game program causes the computer system to further execute:
      calculating a multiplying factor in accordance with the moving distance over which the moving object moves; and
      transforming the contact determination area of the moving object at the time when the moving object is shot so as to be enlarged or reduced by using the multiplying factor.

20. The non-transitory computer readable storage medium according to claim 12, a direction in which the moving object is shot is determined, by using the input from the input device.

21. The non-transitory computer readable storage medium according to claim 12, wherein
a plurality of types of the moving object are shot in the virtual three-dimensional space, and
a degree of change to which the contact determination area of the moving object is changed is determined, for each of the plurality of types of the moving object.

22. The non-transitory computer readable storage medium according to claim 1, wherein
a plurality of types of the moving object are shot in the virtual three-dimensional space, and
a degree of change to which the contact determination area of the moving object is changed is determined, for each of the plurality of types of the moving object.

23. A game apparatus for executing a game in which a target object is shot in a virtual three-dimensional space in accordance with an input from an input device, the game apparatus comprising:
an input reception unit for receiving an input of an instruction for shooting;
a shooting unit for shooting a moving object and moving the moving object in the virtual three-dimensional space in a case where the input reception unit receives the input;
an area change unit for changing at least one of a size, a shape, and a number of a contact determination area of the moving object, by using a variable changing in accordance with the moving object being moved;
a contact determination unit for determining whether or not the contact determination area of the moving object contacts a contact determination area of the target object; and
a contact process unit for performing a predetermined game process when the contact determination unit determines that the contact determination area of the moving object contacts the contact determination area of the target object.

24. The game apparatus according to claim 23, wherein the variable represents an elapsed time after the moving object is shot.

25. The game apparatus according to claim 24, wherein the contact determination area of the moving object is changed such that the longer the elapsed time is, the larger the contact determination area of the moving object is.

26. The game apparatus according to claim 23, wherein the variable represents a moving distance over which the moving object moves in the virtual three-dimensional space.

27. The game apparatus according to claim 26, wherein the contact determination area of the moving object is changed such that the greater the moving distance over which the moving object moves, the larger the size of the contact determination area of the moving object.

28. A method comprising:
receiving an input of an instruction for shooting;
shooting a moving object and moving the moving object in the virtual three-dimensional space;
changing at least one of a size, a shape, or a number of a contact determination area of the moving object, by using a variable changing in accordance with the movement of the moving object;
determining whether the contact determination area of the moving object contacts a contact determination area of the target object; and
performing a predetermined game process when it is determined that the contact determination area of the moving object contacts the contact determination area of the target object.

29. A game system comprising:
a controller configured to be manipulated by a user; and
a computing unit having one or more processors, the computing unit comprising:
an input reception unit for receiving an input of an instruction for shooting via the controller;
a shooting unit for shooting a moving object and moving the moving object in the virtual three-dimensional space in a case where the input reception unit receives the input;
an area change unit for changing at least one of a size, a shape, and a number of a contact determination area of the moving object, by using a variable changing in accordance with the moving object being moved;
a contact determination unit for determining whether or not the contact determination area of the moving object contacts a contact determination area of the target object; and
a contact process unit for performing a predetermined game process when the contact determination unit determines that the contact determination area of the moving object contacts the contact determination area of the target object.

* * * * *